United States Patent
Ivanov et al.

(10) Patent No.: US 12,454,286 B2
(45) Date of Patent: Oct. 28, 2025

(54) DYNAMIC, DIVERSE, AND COMPUTATIONALLY EFFICIENT VEHICLE CANDIDATE ACTION GENERATION

(71) Applicant: Zoox, Inc., Foster City, CA (US)

(72) Inventors: Alexander Ivanov Ivanov, Westminster, CO (US); Matthew Van Heukelom, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 188 days.

(21) Appl. No.: 18/225,601

(22) Filed: Jul. 24, 2023

(65) Prior Publication Data

US 2025/0033665 A1   Jan. 30, 2025

(51) Int. Cl.
  *B60W 60/00*   (2020.01)
  *B60W 40/105*  (2012.01)

(52) U.S. Cl.
  CPC ...... *B60W 60/0011* (2020.02); *B60W 40/105* (2013.01); *B60W 2530/201* (2020.02); *B60W 2552/53* (2020.02)

(58) Field of Classification Search
  CPC ............. B60W 60/011; B60W 40/105; B60W 2530/201; B60W 2552/53
  USPC ........................................................ 701/25
  See application file for complete search history.

(56) References Cited

U.S. PATENT DOCUMENTS

| | | | |
|---|---|---|---|
| 11,390,300 B2 * | 7/2022 | Phillips | B60W 60/00276 |
| 11,561,545 B2 * | 1/2023 | Kobilarov | G01C 21/34 |
| 12,077,181 B1 * | 9/2024 | Costantino | B60W 60/0011 |
| 12,181,890 B2 * | 12/2024 | Ma | G01C 21/3804 |
| 12,280,808 B2 * | 4/2025 | Hagaribommanahalli | G05D 1/0214 |
| 2016/0129907 A1 | 5/2016 | Kim et al. | |
| 2021/0016792 A1 | 1/2021 | Kaneko et al. | |
| 2021/0114617 A1 * | 4/2021 | Phillips | G01C 21/3453 |
| 2023/0139551 A1 * | 5/2023 | Zhao | B60W 30/0956 701/26 |
| 2023/0159056 A1 | 5/2023 | Cheng et al. | |
| 2023/0316778 A1 * | 10/2023 | Kato | B60W 10/20 701/25 |

(Continued)

FOREIGN PATENT DOCUMENTS

| | | |
|---|---|---|
| CN | 111552284 B | 7/2024 |
| KR | 20190014871 A | 2/2019 |

OTHER PUBLICATIONS

Search Report and Written Opinion for International Application No. PCT/US2024/37405, Dated Oct. 24, 2024, 12 pages.

*Primary Examiner* — Andrew Joseph Rudy
(74) *Attorney, Agent, or Firm* — Lee & Hayes, P.C.

(57) ABSTRACT

A vehicle with a planning system may generate a set of candidate trajectories for controlling the vehicle. The planning system may receive sensor data from sensors. The planning system may determine, based at least in part on the sensor data, environmental data, and/or the vehicle data. The planning system may determine, based at least in part on the environmental data and/or the vehicle data, a set of candidate trajectories corresponding to a set of contemporaneous candidate actions for the vehicle to follow. An individual candidate trajectory in the set is determined by dynamically shifting the individual candidate trajectory by a lateral distance relative to the vehicle or a lane in the environment. A candidate action may indicate a position, orientation, velocity, acceleration, or the like for the vehicle to track to by a certain time or distance.

20 Claims, 11 Drawing Sheets

(56) References Cited

U.S. PATENT DOCUMENTS

| | | | |
|---|---|---|---|
| 2024/0208548 A1* | 6/2024 | Caldwell | G05B 13/0265 |
| 2024/0227814 A1* | 7/2024 | Rangesh | G06V 20/588 |
| 2024/0262392 A1* | 8/2024 | Kan | B60W 60/0027 |
| 2024/0400096 A1* | 12/2024 | Gallagher | B60W 60/0011 |

* cited by examiner

DYNAMIC, DIVERSE, AND COMPUTATIONALLY EFFICIENT VEHICLE CANDIDATE ACTION GENERATION

BACKGROUND

The amount of computational resources an autonomous vehicle can devote to a particular task may be limited by the computational resources available on the vehicle and the large number of tasks necessary to safely and efficiently navigate. Optimally, an autonomous vehicle would generate and consider every possible action it could take within the operational abilities of the vehicle but this would introduce computationally prohibitive latency in the autonomous vehicle control pipeline. Meanwhile, it is imperative that any reduction in the number of possible actions computed by the vehicle still provides enough possible actions for the vehicle's consideration to result in safe, efficacious, and normal-appearing movement.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 also illustrates a lane-clamping mode for the candidate actions generated.

DETAILED DESCRIPTION

Figure 1:
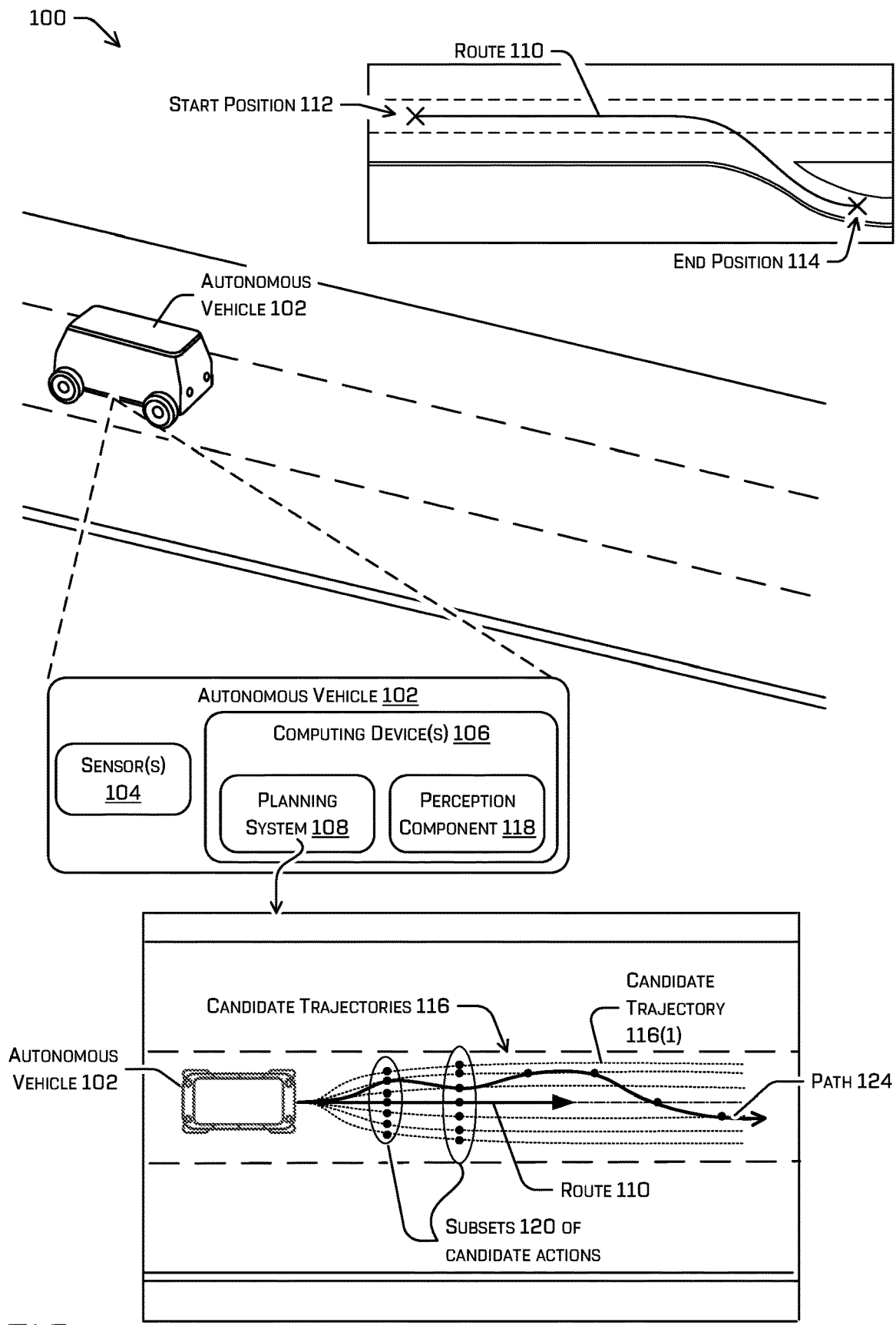
FIG. 1 illustrates an example scenario including an autonomous vehicle which is equipped with a planning system discussed herein for efficiently generating a set of candidate actions comprising dynamic and diverse candidate actions that correspond to a set of candidate trajectories.

The techniques discussed herein may comprise an autonomous vehicle equipped with a planning system that may receive a route (e.g., which may be specified by a passenger, a user, a remote operator, and/or a remote system) associated with a start position and an end position in an environment and determine a path for controlling the autonomous vehicle to navigate in the environment. In some cases, a route can be a sequence of waypoints for traveling between the two locations (e.g., the first location and the second location). The planning system of the vehicle may generate a set of candidate trajectories that may be diversified according to the techniques discussed herein. In some examples, the set of candidate trajectories may identify a set of contemporaneous candidate trajectories that the autonomous vehicle may determine to follow and/or transition between, as a candidate action. For example, a candidate action may identify whether to follow a first candidate trajectory or whether to switch to one of the other candidate trajectories in the set of trajectories. In some examples, an individual candidate trajectory in the set of contemporaneous candidate trajectories can be determined by dynamically shifting the individual candidate trajectory by a lateral distance relative to the vehicle or a lane in the environment. In some instances, the set of candidate actions can include one or more subsets of candidate actions. A set of candidate trajectories can be generated based at least in part on environmental data (e.g., lane boundaries, lane width, roadway shapes, sidewalks indicators, detected object(s), or the like) associated with the environment the autonomous vehicle is operating in. For example, the techniques discussed herein may comprise varying a lateral position and/or velocity indicated by a candidate action based at least in part on environment data and/or vehicle data. When the autonomous vehicle traverses along the route, the planning system may select one candidate trajectory in a subset of candidate trajectories at each time tick and shift between various candidate trajectories to navigate the autonomous vehicle.

A particular candidate trajectory may be associated with at least a lateral displacement from the lane references and/or the vehicle position. An individual candidate action of the subset can correspond to a candidate trajectory in the set of candidate trajectories. Additionally or alternatively, the candidate action may be associated with a position, orientation, velocity, acceleration, and/or the like for the vehicle to reach by a particular time or distance. The autonomous vehicle that includes the planning system discussed herein may thereby be able to navigate accurately and efficiently in various geographic areas.

The planning system may determine the set of candidate actions including subsets of candidate actions that vary spatially (laterally and/or longitudinally) and/or temporally (e.g., by changing the velocities associated therewith) based at least in part on the environmental data and/or vehicle data. In some instances, the subset of candidate actions may comprise regularly or irregularly spaced candidate actions. In some examples, the candidate actions in a subset may be spaced laterally orthogonal to a portion of the route or a trajectory of the vehicle. In other words, the candidate actions may lie laterally across the route or trajectory (e.g., as may be constructed based on a route-relative coordinate frame).

In some examples, the planning system can generate a subset of candidate actions at intervals along the route or trajectory of the vehicle (e.g., next 3 meters, next 5 meters, next 10 meters, next 20 meters of operation). A subset of candidate actions may be laterally spaced from each other and share a same longitudinal distance from the vehicle. The subset of candidate actions may indicate the different trajectories that may be chosen by the vehicle for a particular time and distance. Determining to use one of the candidate actions from a subset may accordingly result in a controller of the vehicle controlling motion of the autonomous vehicle to achieve the chosen trajectory by the time/distance associated with the subset from which the candidate action was chosen. In some instances, the interval between subsets of candidate actions can vary longitudinally based at least in part on vehicle velocity and/or a heuristic (e.g., a heuristic that defines the intervals as being ever-increasing such as generating candidate actions at 1 meter, 2 meters, 4 meters, and 7 meters from the vehicle longitudinally). Additionally or alternatively, the interval may be defined in time. For example, there can be a first space and/or time interval between a first subset of candidate actions and a second subset of candidate actions. There can be a second space and/or time interval between a second subset and a third subset. The first space and/or time interval can be the same or different from the second space and/or time interval. In some examples, the space interval may be associated with an accuracy requirement, a latency requirement, a resource restriction, etc. of the computing system of the autonomous vehicle. In some examples, the space interval can be relatively smaller to control the autonomous vehicle with a relatively higher (in distance or time) velocity, but relatively larger to control the autonomous vehicle with a relatively lower velocity.

In some instances, the number and/or spacing of candidate actions in a subset can vary laterally according to the lateral variance of the candidate trajectories discussed herein. For example, a first candidate action may be associated with a first candidate trajectory that is varied laterally relative to the vehicle and/or other candidate trajectories. Additionally or alternatively, a first subset of candidate actions can include a first number of candidate actions, while a second subset can include a second number of candidate actions, wherein the first number is different from the second number, in which case there may be additional candidate trajectories exist further in distance and/or time from the vehicle. In some examples, the first number and the second number may be the same. In an example where the number of candidate actions in two subsets is different, a subset that is associated with a relatively higher velocity of the autonomous vehicle can have more candidate actions, while a subset that is associated with a relatively lower velocity of the autonomous vehicle can have fewer candidate actions.

In some examples, the candidate trajectories may be varied laterally based at least in part on a lateral location of the vehicle within a lane, a lane width, a vehicle width, and/or the like. For example, a candidate action may be shifted laterally using a heuristic (e.g., a number of meters) from a current lateral position of the vehicle relative to the route, using a fraction of the lane width, using a fraction of the vehicle width, and/or using a fraction of the distance of the vehicle to a lane edge. The techniques may additionally or alternatively include removing a candidate action and/or candidate trajectory that is associated with a lane other than the lane the vehicle is currently in, such as when the route identifies the current lane of the vehicle. However, in an example where the planning component determines that the route requires changing lanes, the candidate action and/or candidate trajectory associated with a lane other than the current lane may be preserved. In an additional or alternate example, the candidate trajectories may be varied laterally based at least in part on environmental data, an offset vehicle position, a width of the vehicle, and/or other vehicle data.

In some examples, the set of candidate actions corresponding to the set of candidate trajectories may be used as part of instantiating a tree search that may determine a path based at least in part on the candidate actions in the set of candidate actions. For example, a candidate action may be indicated by an action node in the tree search, and candidate actions of the same subset of candidate actions may be action nodes at the same level in the tree search. The tree search may determine such a path by choosing a candidate action from a subset of candidate actions at each time tick to execute based on costs determined for a candidate action. Determining a cost associated with a candidate action may include determining a cost, by a cost function, based at least in part on a likelihood that a candidate action avoids an object, a likelihood of impact with an object, conformance to rules of the road, comfort metrics (e.g., an acceleration and/or jerk associated with the candidate action), progress along a route, satisfaction of a mission (e.g., parking, delivering/picking up a passenger), etc. In some instances, the subset of candidate actions corresponds to a node in the tree which is traversed when the planning system determines which candidate action to take and which candidate trajectory to switch to based on the cost function. Details of path planning by the planning system are discussed in U.S. application Ser. No. 16/805,118 and Ser. No. 16/872,284, which are herein incorporated by reference in their entirety for all purposes.

As such, the planning system may generate a set of candidate trajectories with spatial and/or temporal diversity, which may be used by a planning system of the autonomous vehicle to determine a path for the vehicle to follow. Moreover, the techniques discussed herein may save computational resources and storage space since the techniques may reduce a total number of candidate actions instantiated for the tree search while still maintaining the diversity of candidate actions instantiated for the tree search. The techniques may additionally reduce latency of the tree search because the total number of candidate actions generated may be less than former techniques and because the number of candidate actions in different subsets may vary.

Example Scenario

FIG. 1 illustrates an example scenario 100 including an autonomous vehicle 102 which is equipped with a planning system discussed herein for efficiently generating a set of candidate actions comprising dynamic and diverse candidate actions that correspond to a set of candidate trajectories. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to path-finding in simulations, video games, manufacturing, augmented reality, etc. and/or may be used by spacecraft, watercraft, aircraft, or the like in addition to or instead of land vehicles.

The autonomous vehicle 102 may include one or more sensor(s) 104 and one or more computing device(s) 106. For example, the computing device(s) 106 may comprise a planning system 108 discussed herein. In some examples, the planning system 108 may comprise a tree search and/or one or more ML models. In some instances, planning system 108 may comprise the hardware and/or software for conducting the operations discussed herein. The computing device(s) 106 may comprise more or fewer components, and the sensor(s) 104 and planning system 108 are given as a non-limiting example for the sake of comprehension. In some examples, the computing device(s) 106 may comprise processor-executable instructions stored in a memory of the computing device(s) 106 and/or accessible thereto, hardware, and/or some combination thereof (e.g., a field-programmable gate array (FPGA), application-specific integrated circuit (ASIC)).

In some examples, the tree search discussed herein may comprise a tree data structure and/or a search algorithm, such as a Markov decision process (MDP), partially-observable MDP (POMDP), multi-objective MDP (MOMDP), directed acyclic graph (DAG), and/or D*, D*lite, Focused Dynamic A*, A*, LPA*, Dijkstra's algorithm, value iteration (VI), lexicographic value iteration (LVI), and/or the like.

In some examples, an ML model may comprise a neural network such as, for example, a convolutional neural network (CNN) or a transformer. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure.

In the example scenario 100, the autonomous vehicle 102 has received (e.g., from a passenger, from a command center, or the like) and/or determined a route 110 defining a start position 112 and an end position 114. In some cases, the route 110 can be a sequence of waypoints for traveling between the start position 112 and the end position 114. In some cases, waypoints include streets, intersections, global positioning system (GPS) coordinates, etc.

The planning system 108 discussed herein may generate the set of candidate trajectories 116 based at least in part on the environmental data and/or the vehicle data. For example, FIG. 1 depicts that candidate trajectories as dotted curves, of which candidate trajectory 116(1) is one candidate trajectory of the set of candidate trajectories 116. In some examples, the environmental data and/or the vehicle data can be determined based on sensor data captured by sensor(s) 104. The autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc.

In some examples, the perception component 118 may include one or more machine learned (ML) models and/or other computer-executable instructions for detecting, identifying, segmenting, classifying, and/or tracking the environmental data and/or the vehicle data from sensor data collected from the environment of the autonomous vehicle 102. The environmental data may comprise indicators of lanes, roads, roads, freeways, or the like in the environment for the autonomous vehicle 102 to operate. The vehicle data may comprise a status of the autonomous vehicle 102 such as the current velocity, acceleration, the position, orientation, steering angle, steering rate, and/or the like of the autonomous vehicle 102.

In some instances, the planning system 108 may receive sensor data from sensor(s) 104 of the autonomous vehicle 102, determine the set of candidate trajectories 116, determine one or more trajectories based at least in part on the set of candidate trajectories 116, and/or otherwise control operation of the autonomous vehicle 102, though any such operation may be performed in various other components.

The planning system 108 may associate a set of candidate trajectories with a set of candidate actions which may comprise one or more subsets 120 of candidate actions that may be varied spatially and/or temporally based at least in part on the environmental data (e.g., lane references or the like) and/or vehicle data (e.g., vehicle width, vehicle velocity, or the like). In some instances, the subset of candidate actions may comprise regularly or irregularly spaced individual candidate actions. In some examples, the candidate actions in a subset can be orthogonal to a portion of the route 110. In other words, the candidate actions of the subset may lie laterally across the route 110 (e.g., as may be constructed based on a route-relative coordinate frame). In some examples, the planning system 108 can generate a subset of candidate actions at each time tick (e.g., every 0.1 seconds, 0.5 seconds, 1 second, or the like). In some examples, an individual candidate action in the subset can correspond to an individual candidate trajectory.

In some examples, the planning system 108 can generate a subset of candidate actions based at least in part on a space interval (e.g., 1 meter, 2 meters, 3 meters, 5 meters, 10 meters, 20 meters, or the like) along the route 110. In some examples, an individual candidate action in the subset can correspond to an individual candidate trajectory. In some instances, the space intervals among different subsets can vary. For example, there can be a first space interval between a first subset and a second subset. There can be a second space interval between a second subset and a third subset. The first space interval can be different from the second space interval. In some examples, the space interval may be associated with an accuracy requirement, a latency requirement, a resource restriction, etc. of the computing system of the autonomous vehicle 102. In some examples, the space interval can be relatively smaller to control the autonomous vehicle with a relatively higher velocity, but relatively larger to control the autonomous vehicle with a relatively lower velocity.

In some examples, the planning system 108 can generate a subset of candidate actions based at least in part on a velocity of the autonomous vehicle 102. In some examples, an individual candidate action in the subset can correspond to an individual candidate trajectory. For example, the planning system 108 can generate a first subset of candidate actions for a first velocity of the autonomous vehicle 102, and a second subset of candidate actions for a second velocity of the autonomous vehicle 102, where the first velocity can be different from the second velocity. In some instances, the planning system 108 can choose a candidate action in a subset generated for a particular velocity of the autonomous vehicle 102 for further purposes such as path planning or the like.

The computing device(s) 106 of the autonomous vehicle 102 can control the autonomous vehicle 102 to navigate in the environment based at least in part on the set of candidate actions corresponding to the set of candidate trajectories 116. An individual subset of candidate actions may be varied longitudinally in time and/or distance. In some instances, the planning system 108 may be configured to execute a tree search. The tree search may include a decision-making process that uses a tree-like structure to break down a problem into steps and/or tests. The tree search can include nodes and branches, where an individual node may represent a decision to be made regarding which candidate action to take, and each branch may represent the possible outcomes of that node. The top node of the tree is called the root node, and the bottom nodes are called leaf nodes. The tree can be used to classify data, make predictions, and/or provide outcomes based on input data. In some instances, generating the set of candidate trajectories 116 can be a pre-operation for the tree search, as part of the tree search set up. For example, the set of candidate trajectories 116 may correspond to one or more subsets of candidate actions that the tree search may trace a path 124 through. In some examples, a subset of candidate actions may be associated with a same level of the tree search.

The planning system 108 can determine a contiguous path 124 through the set of candidate actions by determining one candidate action from each subset of candidate actions In some examples, the planning system 108 can maintain a same trajectory (when two proximate candidate actions identify a same trajectory). Additionally or alternatively, the planning system 108 can switch between various trajectories, when two proximate candidate actions identify two different trajectories. In some instances, the autonomous vehicle 102 may include a controller that may control the autonomous vehicle 102 to follow the path 124. In some examples, the controller can control the autonomous vehicle 102 to follow the path 124 switching between different candidate trajectories 122 as the autonomous vehicle 102 traverses the environment.

Example Operations

Figure 2:
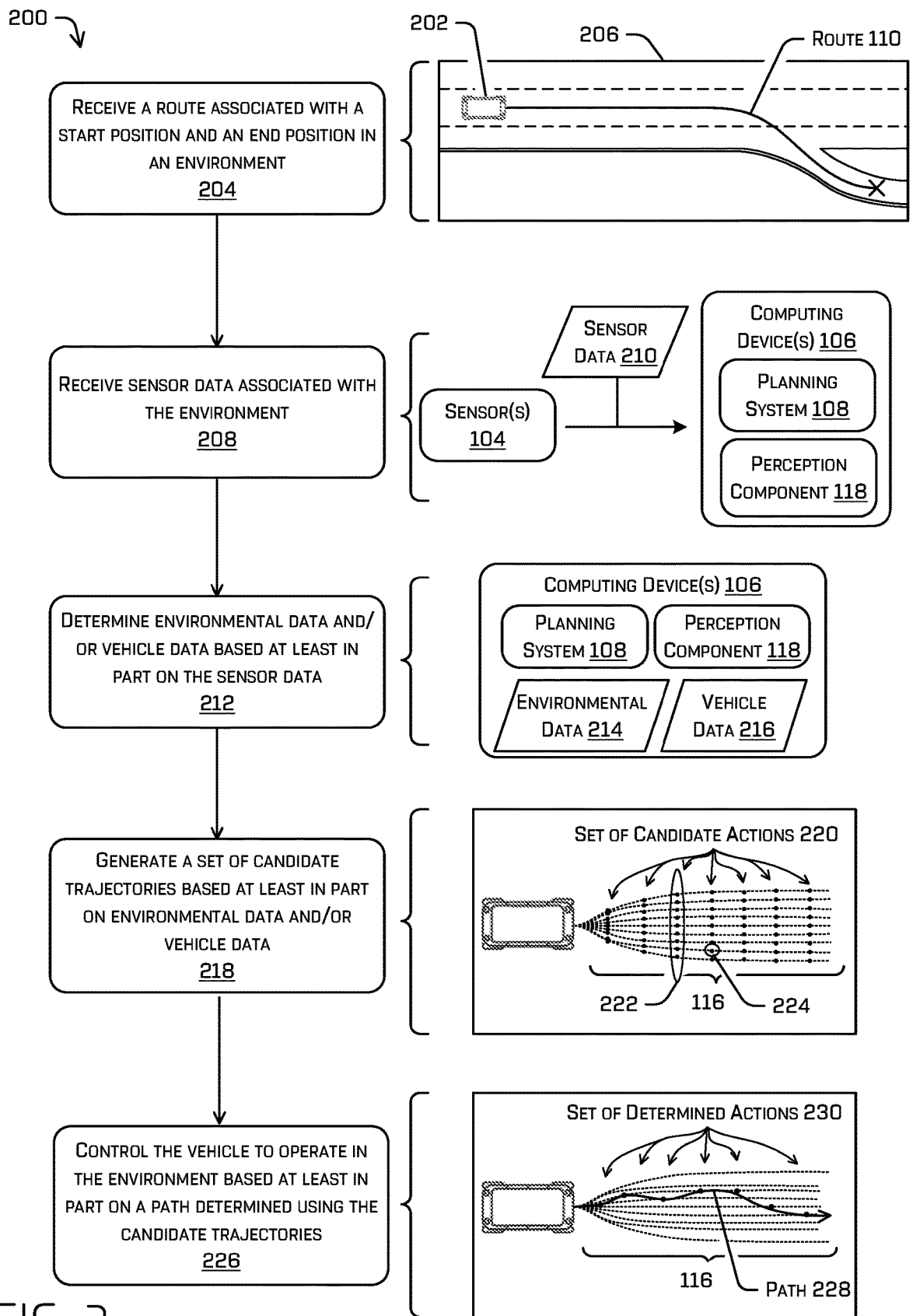
FIG. 2 illustrates pictorial flow diagrams of an example process related to generating a set of candidate trajectories based at least in part on environmental data and/or vehicle data.

FIG. 2 illustrates pictorial flow diagrams of an example process 200 related to generating a set of candidate trajectories based at least in part on environmental data and/or vehicle data. The operations in the process 200 may be used in combination, separately, and/or performed by the same device or different devices. For example, the operations can be implemented by a computing device of an autonomous vehicle 202 and/or a remote computing device (e.g., of a distributed computing service, of a teleoperations system). Hardware and/or software components of a vehicle computing system may be configured to accomplish at least part of the example process 200. In some examples, at least some of the operations of the processes may be precomputed by the autonomous vehicle 202 and/or other computing device(s), such as a distributed computing system.

At operation 204, example process 200 may comprise receiving a route 110 associated with a start position and an end position in an environment 206, according to any of the techniques discussed herein. In some examples, the autonomous vehicle 202 may receive the route 110 based at least in part on a current location of the autonomous vehicle 202 (e.g., determined based at least in part on sensor data) and/or an end position (e.g., a termination point of the route, an intermediate point along the route) from a passenger, a user, a remote computing system, a command center, or the like. In some examples, the route 110 can be associated with a start position and an end position in the environment for the vehicle 202 to operate. In some cases, the route can be a sequence of waypoints for traveling between the two locations (e.g., the first location and the second location). In various examples, the route 110 may comprise map data including lanes, streets, roadways, or the like which can be stored in a memory. The route 110 may identify sequences of roadways or portions thereof, such as lanes, to accomplish a mission. In some instances, the map data can include indicators associated with a lane or a roadway (e.g., single solid lines, double solid lines, single yellow lines, double yellow lines, dashed lines, shoulder indications, sidewalks, curbs, and/or the like).

At operation 208, example process 200 may comprise receiving sensor data 210 associated with the environment 206 from the sensors 104 according to any of the techniques discussed herein. For example, the sensors 104 can collect sensor data 210 associated with the environment 206 and/or the vehicle 202, and send the sensor data 210 to the computing device(s) 106 which includes the planning system 108 and the perception component 118. In some instances, the sensors 104 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc.

At operation 212, example process 200 may comprise determining environmental data 214 and/or vehicle data 216 based at least in part on the sensor data 210. In some examples, the sensor data 210 can be used by a perception component of the vehicle to determine environmental data 214 and/or vehicle data 216. The environmental data 214 may indicate lane references (e.g., single solid lines, double solid lines, single yellow lines, double yellow lines, dashed lines, shoulder indications, sidewalks, curbs, and/or the like), status of objects in the environment (e.g., classification (e.g., pedestrian, vehicle, construction zone, cyclist, roadway, sidewalk, signage), velocity, acceleration, position, orientation, state (e.g., parked, passenger loading/exiting, signage indicates stop/yield/pass), space occupied by an object, whether the object is static (not movable) or dynamic (capable of movement) predicted state, or the like of an object), or the like. The vehicle data 216 may comprise a status of the autonomous vehicle such as the current velocity, acceleration, the position, orientation, steering angle, steering rate, and/or the like of the autonomous vehicle.

At operation 218, example process 200 may comprise generating a set of candidate trajectories 116 based at least in part on the environmental data and/or vehicle data, according to any of the techniques discussed herein. In some instances, the planning system of the vehicle can generate the set of candidate trajectories using lateral spacings between individual trajectories. The spacing between two adjacent the candidate trajectories may be additionally or alternatively based at least in part on a distance to a lane boundary, a lane width, a position of the vehicle within a lane, a width of the vehicle, or the like, any of which may be determined based at least in part on sensor data.

In some examples, operation 218 may additionally or alternatively comprise determining a set of candidate actions 220 over/in association with the set of candidate trajectories 116. For example, the planning system 108 can generate the set of candidate trajectories 116 using lateral spacings between individual trajectories. An individual trajectory may identify a lateral position for the vehicle to maintain over a distance or time and may additionally or alternatively identify a velocity for the vehicle to maintain over that distance or time. The spacing between two adjacent the candidate trajectories may be additionally or alternatively based at least in part on a distance to a lane boundary, a lane width, a position of the vehicle within a lane, a width of the vehicle, or the like, any of which may be determined based at least in part on sensor data. Additional details of trajectory generation are discussed in U.S. application Ser. No. 18/204,097, which are herein incorporated by reference in its entirety for all purposes.

Then, after generating the set of candidate trajectories 116, the planning system 108 can generate the set of candidate actions 220 that correspond to the set of candidate trajectories 116. In some examples, the set of candidate actions 220 can include one or more subsets of candidate actions that lie orthogonally to the route 110 and/or candidate trajectories 116 at time and/or distance intervals along the candidate trajectories 116. In some examples, the planning system 108 can generate an individual subset 222 of candidate actions based on time intervals (e.g., every 0.1 seconds, 0.5 seconds, 1 second, or the like). Additionally or alternatively, the planning system 108 can generate an individual subset of candidate actions along the route 110 according to a space interval (e.g., every 1 meter, 5 meters, 10 meters, etc. of the route). In some examples, an individual candidate action 224 may identify a location at which the autonomous vehicle 202 can operate in the environment.

In some examples, the planning system 108 can adjust the time and/or distance interval between subsets of candidate actions based at least in part on a velocity of the autonomous vehicle. For example, when the autonomous vehicle 202 is operating at a relatively higher velocity, the time interval can be shorter. When the autonomous vehicle 202 is operating at a relatively lower velocity, the time interval can be longer. In some instances, the time intervals among different subsets can vary. For example, there can be a first time interval between a first subset and a second subset. There can be a second time interval between a second subset and a third subset. The first time interval can be different from the second time interval. In some examples, the time interval may be associated with an accuracy target, a latency target, a resource availability, etc. of the computing system of the autonomous vehicle. In some examples, different subsets can include different numbers of candidate actions.

In some examples, the number of candidate actions in an individual subset may be determined arbitrarily or based on criteria (e.g., computing resources available, accuracy requirement, latency requirement, etc.). In some examples, the candidate actions in an individual subset may be regularly or irregularly spaced. In some examples, different subsets can include different numbers of candidate actions.

In some examples, the set of candidate actions corresponding to the set of candidate trajectories may be used as part of instantiating a tree search that may determine a path based at least in part on the candidate actions in the set of candidate actions. For example, a candidate action may be indicated by an action node in the tree search, and candidate actions of the same subset of candidate actions may be action nodes at the same level in the tree search. The tree search may determine such a path by choosing a candidate action from a subset of candidate actions at each time tick to execute based on costs determined for a candidate action. Determining a cost associated with a candidate action may include determining a cost, by a cost function, based at least in part on a likelihood that a candidate action avoids an object, a likelihood of impact with an object, conformance to rules of the road, comfort metrics (e.g., an acceleration and/or jerk associated with the candidate action), progress along a route, satisfaction of a mission (e.g., parking, delivering/picking up a passenger), etc. In some instances, the subset of candidate actions corresponds to a node in the tree which is traversed when the planning system determines which candidate action to take and which candidate trajectory to switch to based on the cost function.

At operation 226, example process 200 may comprise controlling the autonomous vehicle 202 to operate in the environment based at least in part on a path 228 determined using the candidate trajectories, according to any of the techniques discussed herein. In some examples, the planning system 108 of the autonomous vehicle can use the subsets of candidate actions that correspond to the set of candidate trajectories 116 for further purposes in a tree search, such as determining the path 228 between consecutive subsets of candidate actions based at least in part on costs associated with the different candidate actions that may be determined based at least in part on avoiding impact with an object, progress along the route, whether a candidate action is feasible to execute based on the physical characteristics of the vehicle, comfort of transitioning from one candidate trajectory to another (e.g., which may be based at least in part on an acceleration and/or jerk associated with the transition), etc. For example, the tree search may determine a set of determined actions 230 from among the set of candidate actions 220 to implement by the vehicle. These determined actions 230 may be transmitted to a controller of the vehicle that may determine the path 228 between the set of determined actions 230 and may control the vehicle to follow the path 228. Examples of different manners of generating the candidate trajectories 116 and/or a subset of candidate actions 220 are depicted in FIGS. 3-5.

Figure 3:
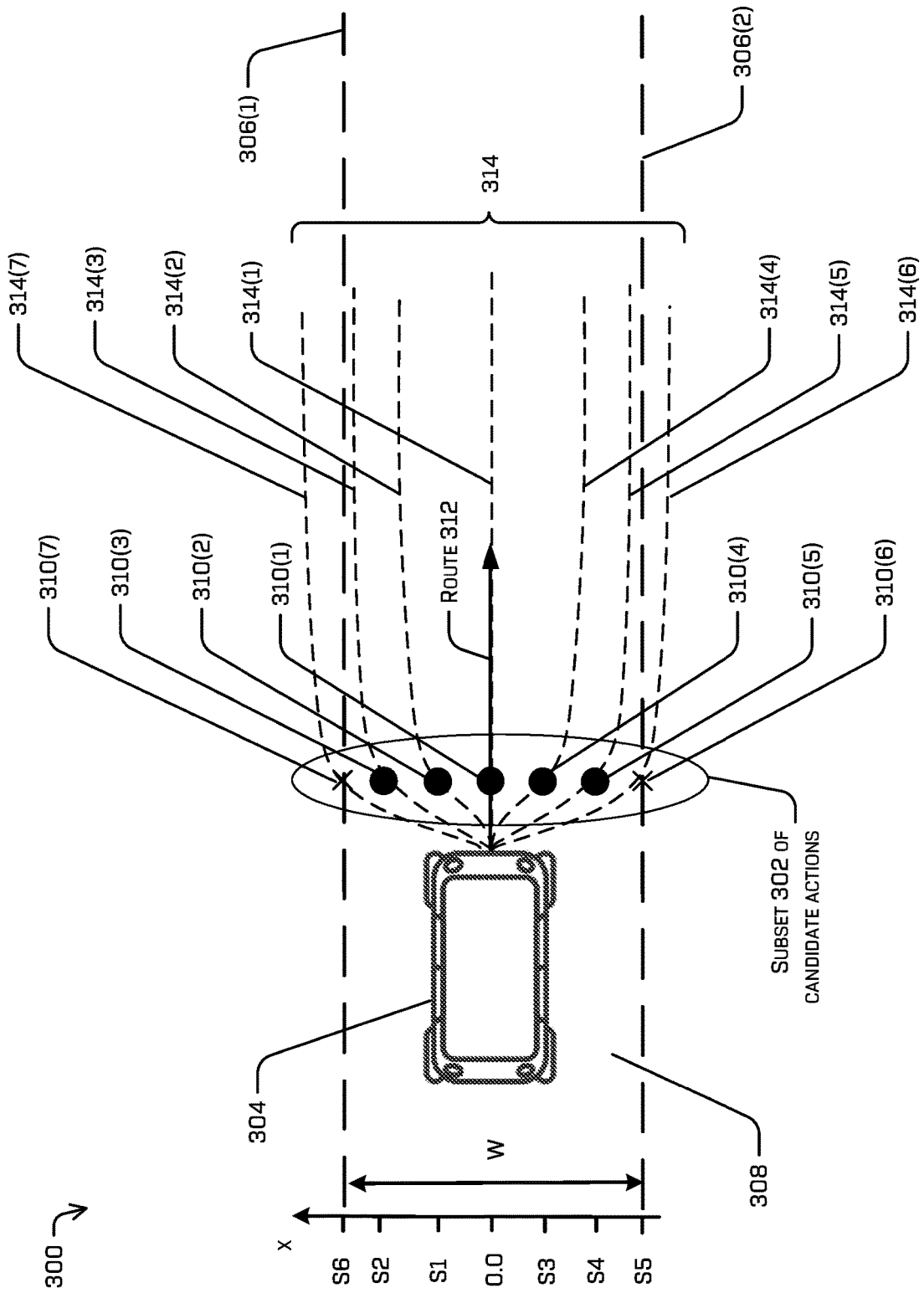
FIG. 3 illustrates an example scenario where a set of candidate trajectories and a subset of candidate actions are generated in a centerline-based lateral shifting mode for the autonomous vehicle based at least in part on environmental data and/or vehicle data.
Figure 4:
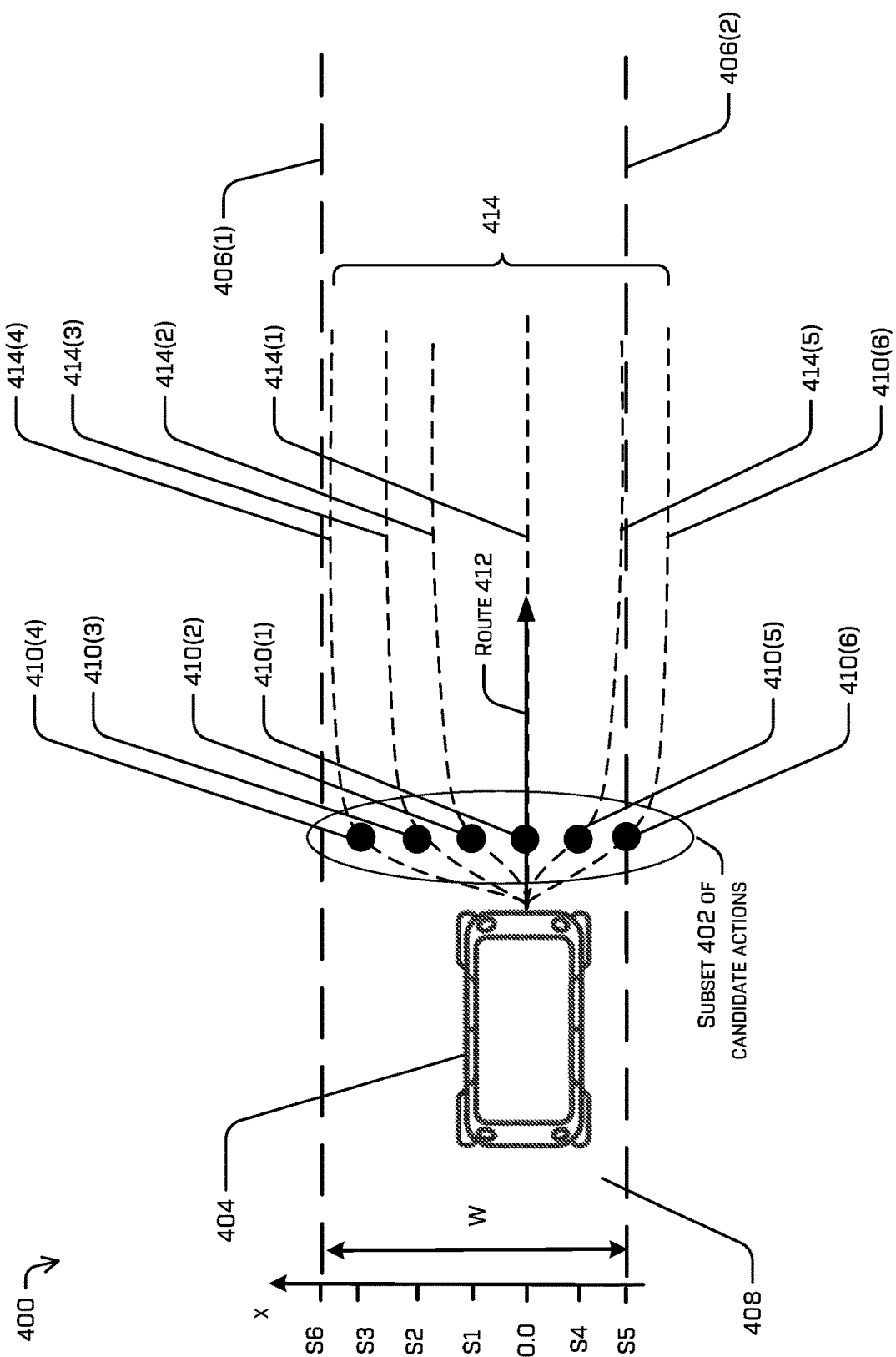
FIG. 4 illustrates an example scenario where a set of candidate trajectories and a subset of candidate actions are generated in a vehicle-position-based lateral shifting mode for the autonomous vehicle based at least in part on environmental data and an offset vehicle position.
Figure 5:
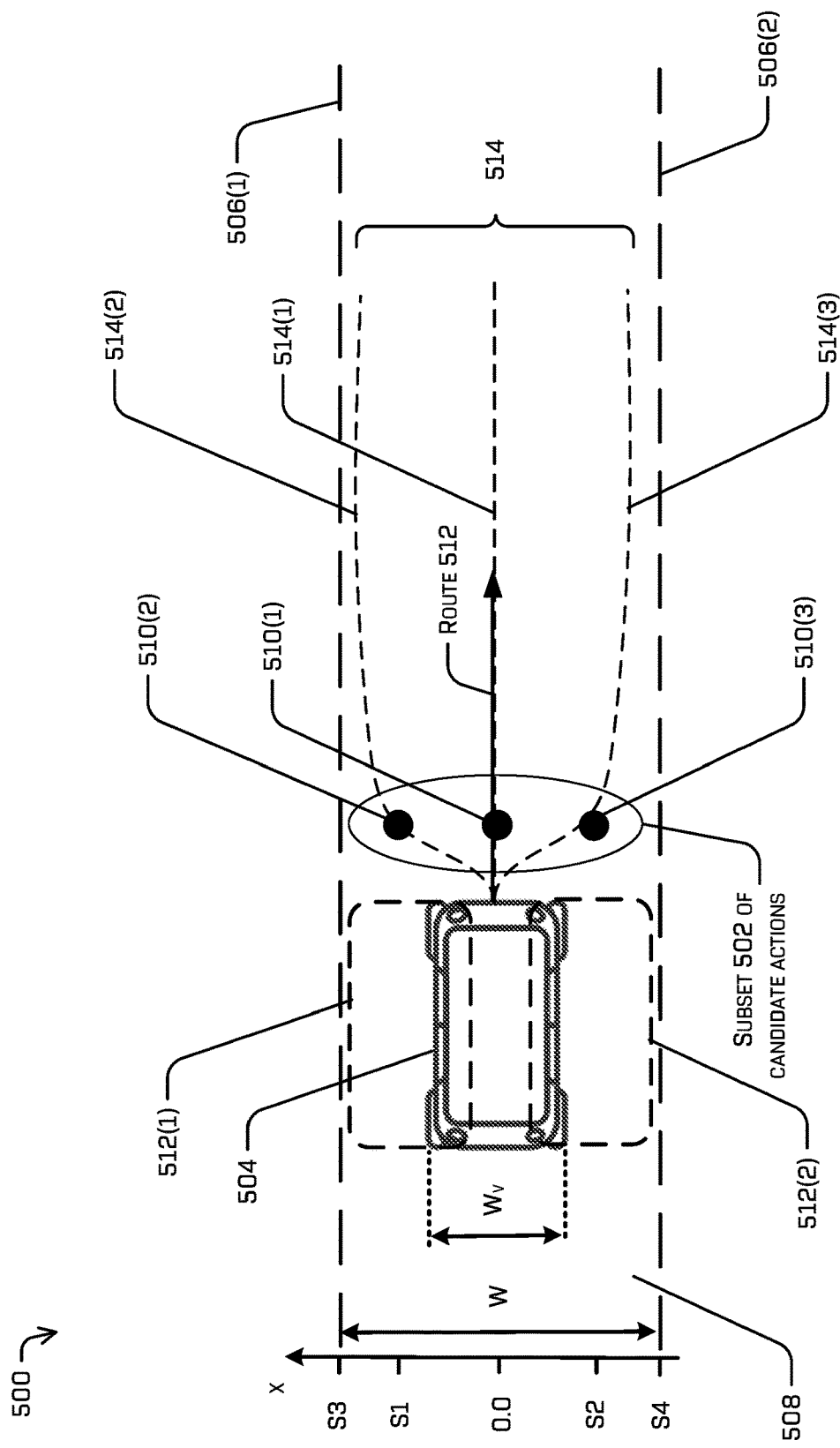
FIG. 5 illustrates an example scenario where a set of candidate trajectories and a subset of candidate actions and an offset vehicle position is generated in a vehicle-width-based lateral shifting mode for the autonomous vehicle based at least in part on environmental data and the vehicle data.

FIGS. 3-5 illustrate various examples of generating a set of candidate trajectories and a corresponding subset of candidate actions that may be generated by the planning system of the vehicle. In some examples, the set of candidate trajectories and the subset of candidate actions are described with respect to FIGS. 3-5 may be generated using different modes based at least in part on environmental data and/or vehicle data. An individual trajectory may identify a lateral position for the vehicle to maintain over a distance or time and may additionally or alternatively identify a velocity for the vehicle to maintain over that distance or time. An individual candidate action may correspond to a location in the environment, and may include a target position, orientation, velocity, acceleration, distance offset from the route, and/or state for the vehicle to achieve by a particular time and/or distance along the route. An individual candidate action, depicted as a dot in the figures, indicates a position that may result from implementing the candidate action. In some examples, the modes described with respect to FIGS. 3-5 may be combined or used individually.

FIG. 3 illustrates an example scenario 300 where a set 314 of candidate trajectories and a subset 302 of candidate actions are generated in a centerline-based lateral shifting mode for the autonomous vehicle 304 based at least in part on environmental data and/or vehicle data. FIG. 3 also illustrates a lane-clamping mode for the candidate actions generated. In some examples, the environmental data can include lane references such as a centerline of the lane, and lane boundaries 306(1) and 306(2) of the lane 308 which define a drivable space for the autonomous vehicle 304 to operate. Though FIG. 3 shows that lane boundaries 306(1) and 306(2) in dashed lines, it should be understood that the lane boundaries 306(1) and 306(2) can be other types of indicators that define lane boundaries, such as single solid lines, double solid lines, single yellow lines, double yellow lines, shoulder indications, sidewalks, curbs, and/or the like.

In some instances, the planning system of the vehicle 304 may generate a set 314 of candidate trajectories including individual candidate trajectories 314(1)-(7) based at least in part on the environmental data and/or vehicle data. Then, the planning system of the vehicle 304 may generate a corresponding subset 302 of candidate actions including individual candidate actions 310(1)-(7) that may be associated with a longitudinal, lateral, and/or angular displacement from the route 312 along which the autonomous vehicle 304 can travel. In some instances, an individual candidate action (e.g., 310(1)-(7)) can correspond to an individual candidate trajectory (e.g., 314(1)-(7)). For example, individual candidate action 310(1) can correspond to individual candidate action 314(1), and individual candidate action 310(2) can correspond to individual candidate action 314(2), etc. Though FIG. 3 shows seven individual candidate trajectories and seven individual candidate actions, it should be understood that there can be other numbers of individual candidate actions in the subset 302 and other numbers of candidate trajectories in the set 314. The individual candidate actions 310(1)-(7) of the subset 302 may be defined by Euclidean coordinates, Euler angles, spherical coordinates, some combination thereof, and/or the like. In some examples, the subset 302 of candidate actions may be used for a tree search related to path-finding, avoiding objects, avoiding collisions, lowing the cost, etc. In some instances, along the route 312, the autonomous vehicle 304 can switch between individual trajectories based on which individual candidate action to take.

The individual candidate trajectories 314(1)-(7) in the set 314 may be generated in the centerline-based lateral shifting mode to lie perpendicular to the lane reference or the route 312 (which may shift between lanes or may be lane-agnostic). In the centerline-based lateral shifting mode, the planning system of the autonomous vehicle 304 may use fractions of the lane width, W, of the lane 308 and/or heuristic distance values to apply a shift laterally from the centerline of the lane 308 to generate individual candidate trajectory (e.g., 314(1)-(7)). The individual candidate actions 314(1)-(7) of the subset 314 can be positioned evenly or unevenly. Referring to FIG. 3, the x-axis can denote a lateral distance from the centerline, wherein 0.0 can denote a coordinate on the x-axis of the centerline of the lane 308. S1, S2, S3, S4, S5, and S6 can denote coordinates on the x-axis of lateral displacements from the centerline. The centerline of a lane refers to a painted or virtual line running along the middle of a lane. In some instances, the centerline can divide the lane into two equal halves.

For example, the planning system of the autonomous vehicle 304 may take the lane references (e.g., the position of the centerline and the lane boundaries 306(1) and 306(2) of the lane 308) as input and generate an individual candidate trajectory 314(1) at the centerline of the lane 308. The planning system of the autonomous vehicle 304 may generate an individual candidate trajectory 314(2) by shifting laterally from the centerline by distance S1 towards the lane boundary 306(1). The planning system of the autonomous vehicle 304 may generate an individual candidate trajectory 314(3) by shifting laterally from the centerline 0.0 by distance S2 towards the lane boundary 306(1). The planning system of the autonomous vehicle 304 may generate an individual candidate trajectory 314(4) by shifting laterally from the centerline 0.0 by distance S3 towards the lane boundary 306(2). The planning system of the autonomous vehicle 304 may generate an individual candidate trajectory 314(5) by shifting laterally from the centerline 0.0 by distance S4 towards the lane boundary 306(2). The planning system of the autonomous vehicle 304 may generate an individual candidate trajectory 314(6) by shifting laterally from the centerline 0.0 by a distance S5 towards the lane boundary 306(2). The planning system of the autonomous vehicle 304 may generate an individual candidate trajectory 310(7) by shifting laterally from the centerline 0.0 by a distance S6 towards the lane boundary 306(1).

In some instances, the lateral distances such as S1, S2, S3, S4, S5, and S6 shifted from the centerline can be fractions (e.g., 0.2W, 0.4W, −0.25W, −0.5W, or the like) of the lane width, W, of the lane 308. Note that such values are exemplary rather than limiting, and other fractions can be used. A fraction of the lane width may refer to a portion or division of the total width of the lane. A fraction can represent a ratio or proportion relative to the full width. In some instances, when the autonomous vehicle 304 operates within the lane 308, the fractions can be restricted to be in the range of [−0.5, 0.5], such that the individual candidate actions do not lie on or beyond the lane boundaries (e.g., 306(1) and 306(2)). Additionally or alternatively, when the autonomous vehicle 304 operates to change lanes, such as when the planning system identifies that a lane change is or will be necessary within a threshold time or distance, the autonomous vehicle 304 can select individual candidate actions that lie on or beyond the lane boundaries (e.g., 306(1) and 306(2)).

Additionally or alternatively, the lateral distances shifted from the centerline such as S1, S2, S3, S4, S5, and S6 can be heuristic distances from the centerline, such as 1.0 meter (m), 2.0 m, −1.0 m, −2.0 m, or the like. Note that such values are exemplary rather than limiting, and other distances can be used. In some instances, various metrics can be used, such as mile (mi), foot (ft), inch (in), kilometer (km), m, centimeter (cm), or the like. In some instances, the operations described herein can be repeated one or more times to generate subsequent subset of candidate actions to form the set of candidate actions discussed herein.

After generating the set 310 of candidate actions (e.g., 310(1)-(7)), the planning system of the autonomous vehicle 304 can generate the corresponding subset 310 of candidate actions (e.g., 310(1)-(7)) accordingly. In some instances, an individual candidate action (e.g., 310(1)-(7)) may correspond to an individual candidate action (e.g., 310(1)-(7)). In some examples, the planning system of the autonomous vehicle 304 can generate individual candidate actions (e.g., 310(1)-(7)) in a manner similar to individual candidate actions (e.g., 310(1)-(7)). For example, the planning system of the autonomous vehicle 304 may take the lane references (e.g., the position of the centerline and the lane boundaries 306(1) and 306(2) of the lane 308) as input and generate an individual candidate action 310(1) at the centerline of the lane 308. The planning system of the autonomous vehicle 304 may generate an individual candidate action 310(2) by shifting laterally from the centerline by distance S1 towards the lane boundary 306(1). The planning system of the autonomous vehicle 304 may generate an individual candidate action 310(3) by shifting laterally from the centerline 0.0 by distance S2 towards the lane boundary 306(1). The planning system of the autonomous vehicle 304 may generate an individual candidate action 310(4) by shifting laterally from the centerline 0.0 by distance S3 towards the lane boundary 306(2). The planning system of the autonomous vehicle 304 may generate an individual candidate action 310(5) by shifting laterally from the centerline 0.0 by distance S4 towards the lane boundary 306(2). The planning system of the autonomous vehicle 304 may generate an individual candidate action 310(6) by shifting laterally from the centerline 0.0 by a distance S5 towards the lane boundary 306(2). The planning system of the autonomous vehicle 304 may generate an individual candidate action 310(7) by shifting laterally from the centerline 0.0 by a distance S6 towards the lane boundary 306(1).

In some instances, the planning system may determine whether an individual candidate action (e.g., 310(1)-(7)) in the subset 302 lies or beyond a lane boundary from a current lane of the vehicle after generating the subset 302. The planning system can determine whether to keep or discard such an individual candidate action (e.g., 310(1)-(7)) in the subset 302 based on whether such a candidate action (e.g., 310(1)-(7)) lies at or beyond a lane boundary. In some instances, the planning system may discard the individual candidate action (e.g., 310(6) and 310(7)) upon determining that the individual candidate action (e.g., 310(6) and 310(7)) lies at or beyond a lane boundary (e.g., 306(1) and 306(2)). FIG. 3 depicts this discarding of a candidate action from the subset with an "x." In some instances, the planning system may keep an individual candidate action (e.g., 310(1)-(5)) in the subset 302 upon determining that the individual candidate action (e.g., 310(1)-(5)) does not lie at or beyond a lane boundary (e.g., 306(1) and 306(2)). As such, when the autonomous vehicle 304 is operating within the lane 308, the planning system can discard candidate actions that are shifted laterally at or outside the lane boundaries, and keep candidate actions in the subset that are within the lane boundaries, to improve the safety of the operation of the autonomous vehicle 304. Additionally or alternatively, when the autonomous vehicle 304 is changing lanes, the planning system may keep candidate actions that lie further laterally (from the vehicle's frame of reference) outside the lane boundaries for the autonomous vehicle 304 to choose.

FIG. 4 illustrates an example scenario 400 where a set 314 of candidate trajectories and a subset 402 of candidate actions are generated in a vehicle-position-based lateral shifting mode for the autonomous vehicle 404 based at least in part on environmental data and an offset vehicle position. In some examples, the environmental data can include lane references such as a position of the centerline of the lane, and lane boundaries 406(1) and 406(2) of the lane 408 which define a drivable space for the autonomous vehicle 404 to operate. In some examples, the vehicle data can include a position and/or orientation of the vehicle in the environment and/or relative to a lane and/or lane boundaries. Though FIG. 4 shows that lane boundaries 406(1) and 406(2) in dashed lines, it should be understood that the lane boundaries 406(1) and 406(2) can be other types of indicators that define lane boundaries, such as single solid lines, double solid lines, single yellow lines, double yellow lines, shoulder indications, sidewalks, curbs, and/or the like.

In some instances, the planning system of the vehicle 404 may generate a set 414 of candidate trajectories including individual candidate trajectories 414(1)-(6) based at least in part on the environmental data and/or vehicle data. Then, the planning system of the vehicle 404 may generate a corresponding subset 402 of candidate actions including individual candidate actions 410(1)-(6) that may be associated with a longitudinal, lateral, and/or angular displacement from the route 412 along which the autonomous vehicle 404 can travel. In some instances, an individual candidate action (e.g., 414(1)-(6)) can correspond to an individual candidate trajectory (e.g., 414(1)-(6)). Though FIG. 4 shows six individual candidate trajectories, it should be understood that there can be other numbers of individual candidate trajectories in the subset 414. The individual candidate trajectories 414(1)-(6) of the subset 414 may be defined by Euclidean coordinates, Euler angles, spherical coordinates, some combination thereof, and/or the like. In some examples, the subset 414 of candidate trajectories may be used for a tree search related to path-finding, avoiding objects, avoiding collisions, lowing the cost, etc. In some instances, along the route 412, the autonomous vehicle 404 can switch between individual trajectories based on which individual candidate action to take.

The individual candidate trajectories 414(1)-(6) of the subset 414 may be generated in a vehicle-position-based lateral shifting mode to lie laterally across the lane. In the vehicle-position-based lateral shifting mode, the planning system of the autonomous vehicle 404 may use fractions of the lane width W of the lane 408 and/or a heuristic distances to apply a shift laterally from the current position of the autonomous vehicle 404 when generating individual candidate trajectories 414(1)-(6). The individual candidate trajectories 414(1)-(6) of the subset 414 can be positioned evenly or unevenly. Referring to FIG. 4, the x-axis can denote a lateral range of the lane 408, wherein 0.0 can denote a coordinate on the x-axis of the center of the current position of the autonomous vehicle 404. S1, S2, S3, S4, S5, and S6 can denote coordinates on the x-axis of lateral displacements from the current position of the vehicle, which may be determined based at least in part on the environmental data and/or the vehicle data. The environmental data and/or the vehicle data may be determined based at least in part on sensor data and/or perception data.

For example, the planning system of the autonomous vehicle 404 may generate an individual candidate trajectory 414(1) at the current position of the vehicle 404. The planning system of the autonomous vehicle 404 may generate an individual candidate trajectory 414(2) by shifting laterally from the current position of the vehicle 404 by distance S1 towards the lane boundary 406(1). The planning system of the autonomous vehicle 404 may generate an individual candidate trajectory 414(3) by shifting laterally from the current position of the vehicle 404 by distance S2 towards the lane boundary 406(1). The planning system of the autonomous vehicle 404 may generate an individual candidate trajectory 414(4) by shifting laterally from the current position of the vehicle 404 by distance S3 towards the lane boundary 406(2). The planning system of the autonomous vehicle 404 may generate an individual candidate trajectory 414(5) by shifting laterally from the current position of the vehicle 404 by distance S4 towards the lane boundary 406(2). The planning system of the autonomous vehicle 404 may generate an individual candidate trajectory 414(6) by shifting laterally from the current position of the vehicle 404 by distance S5 towards the lane boundary 406(2).

In some instances, the lateral distances shifted from the current position of the vehicle 404 such as S1, S2, S3, S4, S5, and S6 can be fractions (e.g., 0.2W, 0.4W, −0.25W, −0.5W, or the like) of the lane width W of the lane 408 or a fraction of the distance from the vehicle to a boundary. Note that such values are exemplary rather than limiting, and other fractions can be used. In some instances, when the autonomous vehicle 404 operates within the lane 408, the distance shifted can be restricted to be in the range of [S5, S6], such that the individual candidate trajectories do not lie on or beyond the lane boundaries (e.g., 406(1) and 406(2)). Additionally or alternatively, when the autonomous vehicle 404 operates to change lanes, the autonomous vehicle 404 can select individual candidate trajectories that lie on or beyond the lane boundaries (e.g., 406(1) and 406(2)).

Additionally or alternatively, the lateral ordinates such as S1, S2, S3, S4, S5, and S6 can be heuristic distances, such as 1.0 m, 2.0 m, 3.0 m, −1.0 m, or the like. Note that such values are exemplary rather than limiting, and other distances can be used. In some instances, various metrics can be used, such as mile (mi), foot (ft), inch (in), kilometer (km), m, centimeter (cm), or the like. In some instances, the operations described herein can be repeated one or more times to generate a subsequent subset of candidate actions to form the set of candidate actions discussed herein.

In some instances, the current position of the vehicle 404 is not aligned with the centerline of the lane 408. Alternatively, the current position of the vehicle 404 can be aligned with the centerline of the lane 408. In some examples, the planning system can recenter the zero point 0.0 of the x-axis to be at the current position of the autonomous vehicle 404 at each time tick as the autonomous vehicle 404 operates in the environment.

After generating the set 410 of candidate trajectories (e.g., 410(1)-(7)), the planning system of the autonomous vehicle 404 can generate a corresponding subset 410 of candidate actions (e.g., 410(1)-(7)) accordingly. In some instances, an individual candidate action (e.g., 410(1)-(7)) may correspond to an individual candidate action (e.g., 410(1)-(7)). In some examples, the planning system of the autonomous vehicle 404 can generate individual candidate actions (e.g., 410(1)-(7)) in a manner similar to individual trajectories (e.g., 410(1)-(7)). For example, the planning system of the autonomous vehicle 404 may generate an individual candidate action 410(1) at the current position of the vehicle 404. The planning system of the autonomous vehicle 404 may generate an individual candidate action 410(2) by shifting laterally from the current position of the vehicle 404 by distance S1 towards the lane boundary 406(1). The planning system of the autonomous vehicle 404 may generate an individual candidate action 410(3) by shifting laterally from the current position of the vehicle 404 by distance S2 towards the lane boundary 406(1). The planning system of the autonomous vehicle 404 may generate an individual candidate action 410(4) by shifting laterally from the current position of the vehicle 404 by distance S3 towards the lane boundary 406(2). The planning system of the autonomous vehicle 404 may generate an individual candidate action 410(5) by shifting laterally from the current position of the vehicle 404 by distance S4 towards the lane boundary 406(2). The planning system of the autonomous vehicle 404 may generate an individual candidate action 410(6) by shifting laterally from the current position of the vehicle 404 by distance S5 towards the lane boundary 406(2).

In some examples, the individual candidate actions can be positioned asymmetrically with respect to the zero point (the current position of the autonomous vehicle 404), where the number of individual candidate actions positioned on one side of the zero point is not the same as the number of individual candidate actions positioned on the other side. Alternatively, the individual candidate actions can be positioned symmetrically with respect to the zero point (the current position of the autonomous vehicle 404), where the number of individual candidate actions positioned on one side of the zero point is the same as the number of individual candidate actions positioned on the other side.

FIG. 5 illustrates an example scenario 500 where a set 514 of candidate trajectories and a subset 502 of candidate actions and an offset vehicle position is generated in a vehicle-width-based lateral shifting mode for the autonomous vehicle 504 based at least in part on environmental data and the vehicle data. In some examples, the environmental data can include lane references such as a position of the centerline of the lane, lane boundaries 506(1) and 506(2) of the lane 508 which define a drivable space for the autonomous vehicle 504 to operate. In some examples, the vehicle data can include the width $W_V$ of the autonomous vehicle 504 and/or other parameters of the autonomous vehicle 504. Though FIG. 5 shows that lane boundaries 506(1) and 506(2) in dashed lines, it should be understood that the lane boundaries 506(1) and 506(2) can be other types of indicators that define lane boundaries, such as single solid lines, double solid lines, single yellow lines, double yellow lines, shoulder indications, sidewalks, curbs, and/or the like.

In some instances, the planning system of the vehicle 504 may generate a set 514 of candidate trajectories including individual candidate trajectories 514(1)-(7) based at least in part on the environmental data and/or vehicle data. Then, the planning system of the vehicle 504 may generate a corresponding subset 502 of candidate actions including individual candidate actions 510(1)-(7) that may be associated with a longitudinal, lateral, and/or angular displacement from the route 512 along which the autonomous vehicle 504 can travel. In some instances, an individual candidate action (e.g., 510(1)-(3)) can correspond to an individual candidate trajectory (e.g., 514(1)-(3)). Though FIG. 5 shows three individual candidate actions and three individual trajectories, it should be understood that there can be other numbers of individual candidate actions in the subset 502 of candidate actions and other numbers of candidate trajectories. The individual candidate actions 510(1)-(3) of the subset 502 may be defined by Euclidean coordinates, Euler angles, spherical coordinates, some combination thereof, and/or the like. In some examples, the subset 502 of candidate actions may be used for a tree search related to path-finding, avoiding objects, avoiding collisions, lowing the cost, etc. In some instances, along the route 312, the autonomous vehicle 304 can switch between individual trajectories based on which individual candidate action to take.

The individual candidate trajectories 514(1)-(3) of the subset 502 may be generated in the vehicle-width-based lateral shifting mode to lie perpendicular to the lane reference or the route 512. In the vehicle-width-based lateral shifting mode, the planning system of the autonomous vehicle 504 may use fractions of the vehicle $W_V$ of the autonomous vehicle 504, fractions of the lane width, W, of the lane 508, and/or heuristic distance values to apply a shift laterally from the boundaries of the lane 508 to generate individual candidate trajectories (e.g., 514(1)-(3), or the like). The individual candidate trajectories 514(1)-(3) of the subset 302 can be positioned evenly or unevenly. Referring to FIG. 5, the x-axis can denote a lateral range of the lane 508, wherein 0.0 can denote a coordinate on the x-axis of the centerline of the lane 508. S1, S2, and S3 can denote coordinates on the x-axis of lateral displacements shifted from the centerline or the lane boundaries.

For example, the planning system of the autonomous vehicle 504 may take the lane references (e.g., the position of the centerline and the lane boundaries 506(1) and 506(2) of the lane 508) as input and generate an individual candidate trajectory 514(1) at the centerline of the lane 508. The planning system of the autonomous vehicle 504 may generate an individual candidate trajectory 514(2) by shifting laterally by distance (S3-S1) from the lane boundary 506(1) to S1. The planning system of the autonomous vehicle 504 may generate an individual candidate trajectory 514(3) by shifting laterally by distance (S4-S2) from the lane boundary 506(2) to S2.

After generating the set 510 of candidate trajectory (e.g., 514(1)-(3)), the planning system of the autonomous vehicle 504 can generate a corresponding subset 510 of candidate actions (e.g., 510(1)-(3)) accordingly. In some instances, an individual candidate action (e.g., 510(1)-(3)) may correspond to an individual trajectory (e.g., 514(1)-(3)). In some examples, the planning system of the autonomous vehicle 504 can generate individual candidate actions (e.g., 510(1)-(3)) in a manner similar to individual candidate actions (e.g., 514(1)-(3)). For example, the planning system of the autonomous vehicle 504 may take the lane references (e.g., the position of the centerline and the lane boundaries 506(1) and 506(2) of the lane 508) as input and generate an individual candidate action 510(1) at the centerline of the lane 508.

The planning system of the autonomous vehicle 504 may generate an individual candidate action 510(2) by shifting laterally by distance (S3-S1) from the lane boundary 506(1) to S1. The planning system of the autonomous vehicle 504 may generate an individual candidate action 510(3) by shifting laterally by distance (S4-S2) from the lane boundary 506(2) to S2.

In some instances, the lateral distances such as S1, S2, S3, and S4 shifted from the center line, or the lateral distances shifted from lane boundaries such as (S3-S1) and (S4-S2) can be fractions of the vehicle width $W_V$ of the autonomous vehicle 504 (e.g., 0.5 $W_V$, 0.6$W_V$, 0.75$W_V$, −0.8$W_V$, or the like). Note that such values are exemplary rather than limiting, and other fractions can be used. In some instances, when the autonomous vehicle 504 operates within the lane 408, the laterally coordinate S1 can be restricted to be in the range of [0, (S3-0.5$W_V$)], and the laterally coordinate S2 can be restricted to be in the range of [0, (S4-0.5$W_V$)], such that the individual candidate actions do not lie at or beyond the lane boundaries. Additionally or alternatively, when the autonomous vehicle 504 operates to change lanes, the autonomous vehicle 504 can select individual candidate actions that lie on or beyond the lane boundaries (e.g., 506(1) and 506(2)).

A fraction of the vehicle width may refer to a portion or division of the total width of the vehicle. A fraction can represent a ratio or proportion relative to the full width. As such, individual candidate actions (e.g., 510(1) and 510(2)) which are shifted by a fraction of the vehicle width $W_V$ from the lane boundaries (e.g., 506(1) and 506(2)) can be generated. For example, a fraction of 0.5 may shift a distance of 0.5*$W_V$ away from the lane boundary (e.g., 506(1) and 506(2)). In other words, a fraction value of 0.5 may generate a trajectory where an outside edge of the autonomous vehicle 504 rides along a lane boundary (e.g., 506(1) and 506(2)). For example, dashed line box 512(1) may represent a vehicle position where the autonomous vehicle 504 rides along the lane boundary 506(1). Dashed line box 512(2) may represent a vehicle position where the autonomous vehicle 504 rides along the lane boundary 506(2). In some instances, a fraction value that is less than 0.5 may generate a scenario where the autonomous vehicle 504 straddles an adjacent lane, while a fraction value that is greater than 0.5 may generate a scenario where the autonomous vehicle 504 travels close to the centerline of the lane 508. A fraction value of 0.5 may generate a scenario where the autonomous vehicle 504 straddles the lane boundaries 506(1) and 506(2). In some instances, when the autonomous vehicle 504 is operating within the lane 508, the fraction value can be restricted in the range of [−0.5, 0.5], such that the autonomous vehicle 504 does not travel on or beyond the lane boundaries 506(1) and 506(2). Additionally or alternatively, when the autonomous vehicle 504 is changing lanes, the planning system may generate candidate actions that lie further laterally (from the vehicle's frame of reference) outside the lane boundaries (e.g., 506(1) and 506(2)) for the autonomous vehicle 504 to choose.

Given the above, FIGS. 3-5 illustrate various example scenarios where a subset of candidate actions is generated for the autonomous vehicle in various modes based at least in part on environmental data. In some instances, the centerline-based lateral shifting mode, vehicle-position-based lateral shifting mode, and vehicle-width-based lateral shifting mode can be used in any combination based at least in part on the environmental data to generate individual candidate actions in a subset for the autonomous vehicle that operates in the environment.

In some instances, in the scenarios depicted in FIGS. 3-5, the planning system of the autonomous vehicle may determine whether an individual candidate action in the subset lies or beyond the lane boundaries. The planning system can determine whether to keep or discard such an individual candidate action in the subset based on whether such a candidate action lies at or beyond the lane boundaries. As such, when the autonomous vehicle is operating within the lane, the planning system can discard candidate actions that are shifted laterally at or outside the lane boundaries, and keep candidate actions in the subset that are within the lane boundaries, to improve the safety of the operation of the autonomous vehicle. Additionally or alternatively, when the autonomous vehicle is changing lanes, the planning system may keep candidate actions that lie further laterally (from the vehicle's frame of reference) outside the lane boundaries for the autonomous vehicle to choose.

In some examples, the subset of candidate actions corresponding to the set of candidate trajectories may be used as part of instantiating a tree search that may determine a path based at least in part on the candidate actions in the set of candidate actions. For example, a candidate action may be indicated by an action node in the tree search, and candidate actions of the same subset of candidate actions may be action nodes at the same level in the tree search. The tree search may determine such a path by choosing a candidate action from a subset of candidate actions at each time tick to execute based on costs determined for a candidate action. Determining a cost associated with a candidate action may include determining a cost, by a cost function, based at least in part on a likelihood that a candidate action avoids an object, a likelihood of impact with an object, conformance to rules of the road, comfort metrics (e.g., an acceleration and/or jerk associated with the candidate action), progress along a route, satisfaction of a mission (e.g., parking, delivering/picking up a passenger), etc. In some instances, the subset of candidate actions corresponds to a node in the tree which is traversed when the planning system determines which candidate action to take and which candidate trajectory to switch to based on the cost function.

Example Set of Candidate Actions

Figure 6:
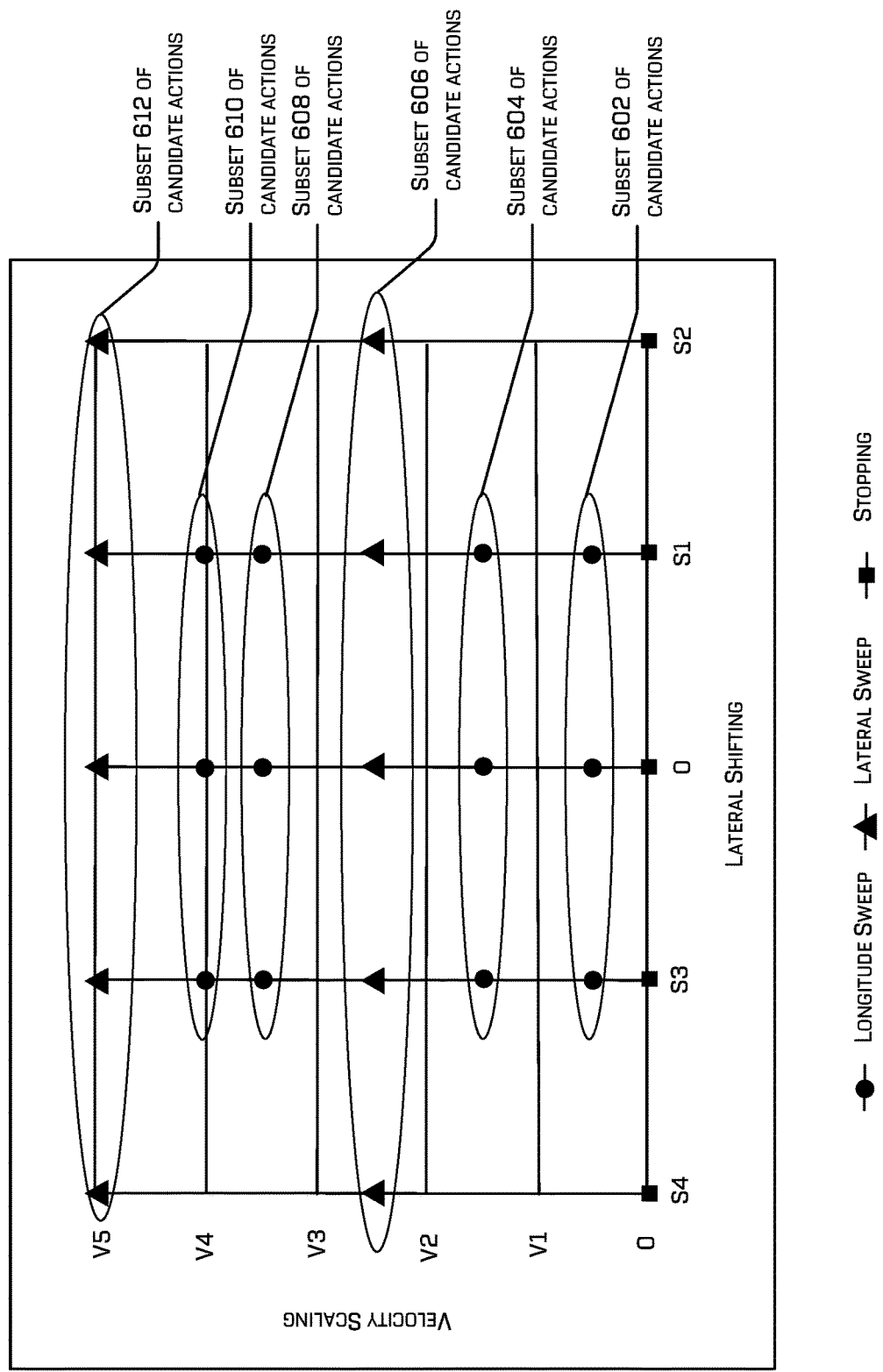
FIG. 6 illustrates a diagram showing an example set of candidate actions using laterally symmetric shifting and/or velocity scaling generated for an autonomous vehicle operating in an environment.

FIG. 6 illustrates a diagram showing an example set of candidate actions 600 using laterally symmetric and/or velocity scaling generated for an autonomous vehicle operating in an environment. Referring to FIG. 6, the round dots may denote a longitude sweep. The triangular dots may denote a lateral sweep. The rectangular dots may denote stopping positions. A "sweep" may refer to the process of scanning or exploring the environment to create a set of candidate actions-based representations for navigation. In FIG. 6, the horizontal axis may represent a lateral shifting, and the vertical axis may represent a velocity of the autonomous vehicle. Along the horizontal axis, 0 can denote the coordinate on the x-axis of a centerline of the lane or the current position of the autonomous vehicle. S1, S2, S3, and S4 can denote coordinates on the x-axis of lateral displacements shifted from the centerline of the lane or the current position of the autonomous vehicle. Along the vertical axis, 0 can represent that the autonomous vehicle stops, and a velocity of the autonomous vehicle is 0. V1, V2, V3, V4, and V5 can represent velocities of the autonomous vehicle. As such, the set of candidate actions 600 can provide spatial and temporal diversity for the autonomous vehicle to navigate in the environment. In some instances, the set of candidate actions 600 can be used for further purposes in a tree search, such as switching between candidate trajectories at each time tick, choosing paths between two way points (e.g., from a start point to an end point of a route), avoiding objects, avoiding collisions, etc. based on costs or other criteria.

Various subsets (e.g., 602, 604, 606, 608, 610, and 612) of candidate actions can be generated based at least in part of the environmental data and/or the vehicle data for the autonomous vehicle which operates in the environment. Details regarding how to generate a subset of candidate actions are given throughout this disclosure. In some instances, the subsets (e.g., 602, 604, 606, 608, 610, and 612) of candidate actions can be generated in the same modes or different modes, such as any of the modes or combinations thereof discussed above regarding FIGS. 3-5. For example, a planning system of the autonomous vehicle can generate a subset 602 of candidate actions based on the zero point and lateral shifting distances. The planning system of the autonomous vehicle can generate a subset 604 of candidate actions similarly but based on a different velocity of the autonomous vehicle. The planning system of the autonomous vehicle can generate more subsets (e.g., 606, 608, 610, and 612) of candidate actions for various velocities of the autonomous vehicle. Generating various subsets of candidate actions can be referred to as velocity scaling, because the subsets spread along the velocity dimension.

In some instances, more candidate actions can be generated for some subsets (e.g., 606 and 612). For example, when the velocity of the autonomous vehicle is relatively high, more candidate actions can be generated for the subset, such that the autonomous vehicle has more options to choose from when conducting the tree search to determine a path for the autonomous vehicle to follow. On the other hand, when the velocity of the autonomous vehicle is relatively low, the candidate action number of the subset can be kept low. As such, the candidate action number generated can be kept at a relatively low level so as to save computing resources, reserve storage space, reduce latency, etc. Though FIG. 6 shows that each of the subsets 602, 604, 608, and 610 includes 3 candidate actions, and each of the subsets 606 and 612 includes 5 candidate actions, it should be understood that these numbers are exemplary rather than limiting.

Figure 7:
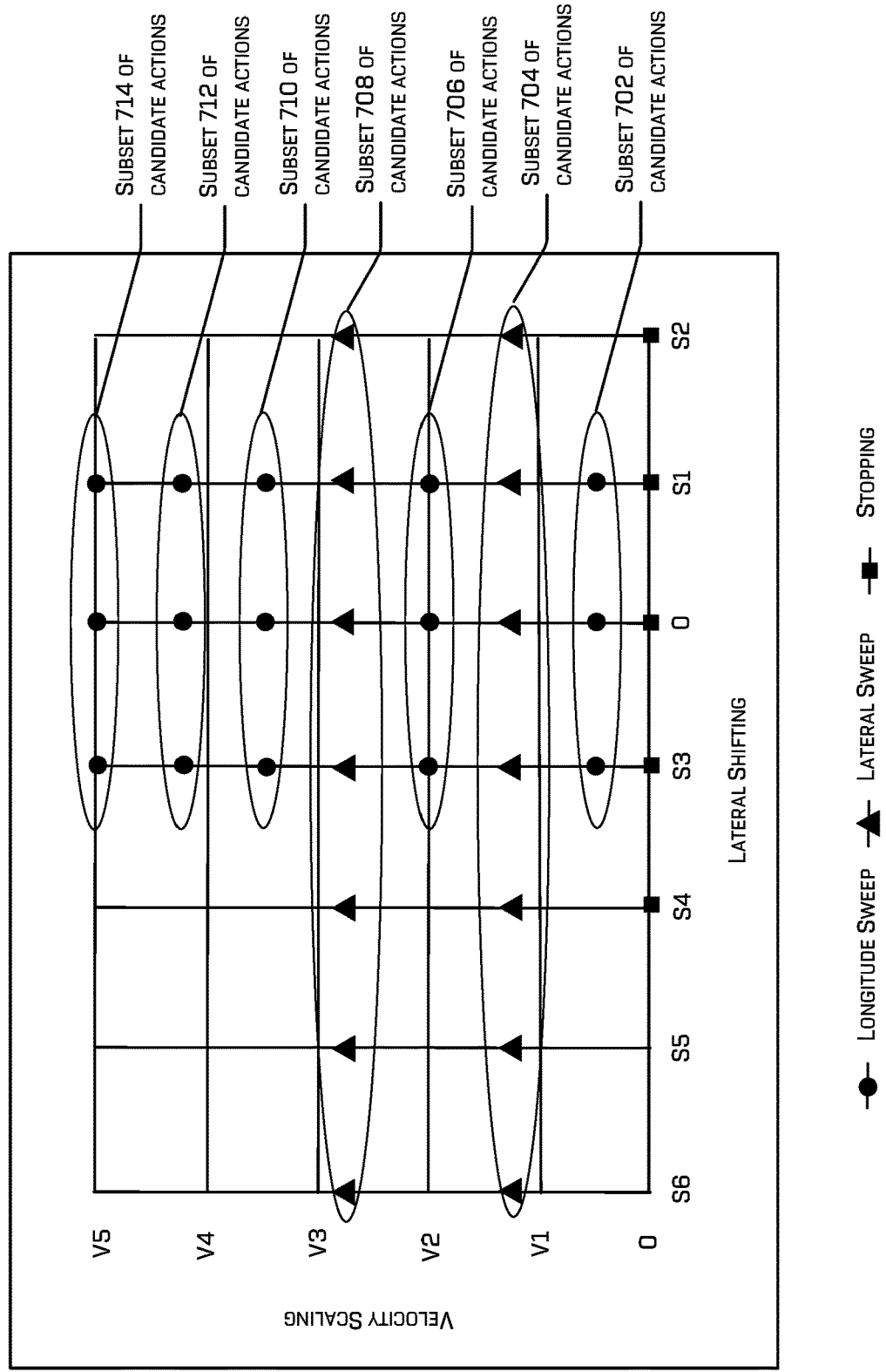
FIG. 7 illustrates a diagram showing an example set of candidate actions using uniformly spaced but laterally asymmetric shifting and/or velocity scaling generated for an autonomous vehicle operating in an environment.

FIG. 7 illustrates a diagram showing an example set of candidate actions 700 using uniformly spaced but laterally asymmetric shifting and/or velocity scaling generated for an autonomous vehicle operating in an environment. Referring to FIG. 7, the round candidate actions may denote a longitude sweep. The triangular candidate actions may denote a lateral sweep. The rectangular candidate actions may denote stopping positions. In FIG. 7, the horizontal axis may represent a lateral shifting, and the vertical axis may represent a velocity of the autonomous vehicle. Along the horizontal axis, 0 can denote the coordinate on the x-axis of a centerline of the lane or the current position of the autonomous vehicle. S1, S2, S3, S4, S5, and S6 can denote coordinates on the x-axis of lateral displacements shifted from the centerline of the lane or the current position of the autonomous vehicle. Along the vertical axis, 0 can represent that the autonomous vehicle stops, and a velocity of the autonomous vehicle is 0. V1, V2, V3, V4, and V5 can represent velocities of the autonomous vehicle. As such, the set of candidate actions 700 can provide spatial and temporal diversity for the autonomous vehicle to navigate in the environment. In some instances, the set of candidate actions 700 can be used for further purposes in a tree search, such as switching between candidate trajectories at each time tick, choosing paths between two way points (e.g., from a start point to an end point of a route), avoiding objects, avoiding collisions, etc. based on costs or other criteria.

Various subsets (e.g., 702, 704, 706, 708, 710, 712, and 714) of candidate actions can be generated based at least in part on the environmental data and/or the vehicle data for the autonomous vehicle which operates in the environment. Details regarding how to generate a subset of candidate actions are given throughout this disclosure. In some instances, the subsets (e.g., 702, 704, 706, 708, 710, 712, and 714) of candidate actions can be generated in the same modes or different modes. For example, a planning system of the autonomous vehicle can generate a subset 702 of candidate actions based on the zero point and lateral shifting distances. The planning system of the autonomous vehicle can generate a subset 704 of candidate actions similarly but with a different velocity of the autonomous vehicle. The planning system of the autonomous vehicle can generate more subsets (e.g., 706, 708, 710, 712, and 714) of candidate actions for various velocities of the autonomous vehicle. Generating various subsets of candidate actions can be referred to as velocity scaling, because the subsets spread along the velocity dimension.

One difference between FIG. 6 and FIG. 7 lies in that, some subsets (e.g., 704 and 708) include more candidate actions shifted to the left from the zero point than to the right. In some instances, the rightmost lane usually includes street parking spaces or bike lanes, and thus lateral maneuvers of the autonomous vehicle may be taken more frequently. Therefore, it can be useful to provide more candidate actions shifted to the left from the zero point than to the right for the autonomous vehicle to choose when the autonomous vehicle is traversing the environment.

In some instances, more candidate actions can be generated for some subsets (e.g., 704 and 708). For example, when the velocity of the autonomous vehicle is relatively high, more candidate actions can be generated for the subset, such that the autonomous vehicle has more options when conducting the tree search. On the other hand, when the velocity of the autonomous vehicle is relatively low, the candidate action number of the subset can be kept low. As such, the candidate actions number generated can be kept at a relatively low level so as to save computing resources, reduce the latency, etc. Though FIG. 7 shows that each of the subsets 702, 706, 708, 710, 712, and 714 includes 3 candidate actions, and each of the subsets 704 and 712 includes 3 candidate actions, it should be understood that these numbers are exemplary rather than limiting.

Figure 8:
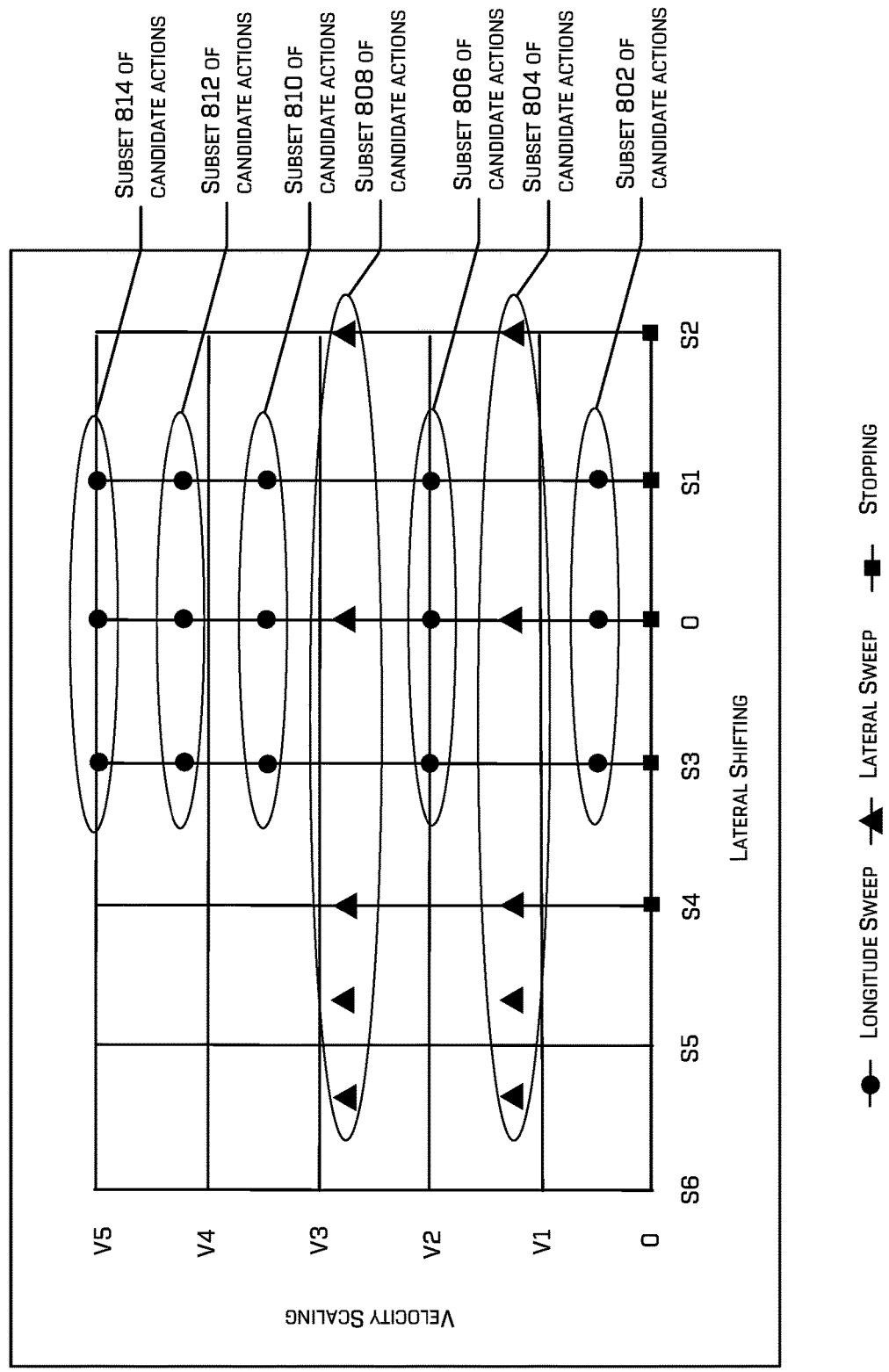
FIG. 8 illustrates a diagram showing an example set of candidate actions using non-uniformly spaced and laterally asymmetric shifting and/or velocity scaling generated for an autonomous vehicle operating in an environment.

FIG. 8 illustrates a diagram showing an example set of candidate actions using non-uniformly spaced and laterally asymmetric shifting and/or velocity scaling generated for an autonomous vehicle operating in an environment. Referring to FIG. 8, the round candidate actions may denote a longitude sweep. The triangular candidate actions may denote a lateral sweep. The rectangular candidate actions may denote stopping positions. In FIG. 8, the horizontal axis may represent a lateral shifting, and the vertical axis may represent a velocity of the autonomous vehicle. Along the horizontal axis, 0 can denote the coordinate on the x-axis of a centerline of the lane or the current position of the autonomous vehicle. S1, −S2, S3, S4, S5, and S6 can denote coordinates on the x-axis of lateral displacements shifted from the centerline of the lane or the current position of the autonomous vehicle. Along the vertical axis, 0 can represent that the autonomous vehicle stops, and a velocity of the autonomous vehicle is 0. V1, V2, V3, V4, and V5 can represent velocities of the autonomous vehicle. As such, the set of candidate actions 800 can provide spatial and temporal diversity for the autonomous vehicle to navigate in the environment. In some instances, the set of candidate actions 800 can be used for further purposes in a tree search, such as switching between candidate trajectories at each time tick, choosing paths between two way points (e.g., from a start point to an end point of a route), avoiding objects, avoiding collisions, etc. based on costs or other criteria.

Various subsets (e.g., 802, 804, 806, 808, 810, 812, and 814) of candidate actions can be generated based at least in part of the environmental data and/or the vehicle data for the autonomous vehicle which operates in the environment. Details regarding how to generate a subset of candidate actions are given throughout this disclosure. In some instances, the subsets (e.g., 802, 804, 806, 808, 810, 812, and 814) of candidate actions can be generated in the same modes or different modes. For example, a planning system of the autonomous vehicle can generate a subset 802 of candidate actions based on the position of the zero point and lateral shifting distances. The planning system of the autonomous vehicle can generate a subset 804 of candidate actions similarly but with a different velocity of the autonomous vehicle. The planning system of the autonomous vehicle can generate more subsets (e.g., 806, 808, 810, 812, and 814) of candidate actions for various velocities of the autonomous vehicle. Generating various subsets of candidate actions can be referred to as velocity scaling, because the subsets spread along the velocity dimension.

A difference between FIG. 7 and FIG. 8 lies in that, the lateral range of candidate actions in some subsets (e.g., 804 and 808) is narrower than the lateral range of candidate actions in some subsets (e.g., 704 and 708) because large lateral maneuvers should be conducted with caution. Therefore, it can be useful to provide candidate actions shifted laterally from the zero point with a narrow range for the autonomous vehicle to choose when the autonomous vehicle is traversing the environment.

In some instances, more candidate actions can be generated for some subsets (e.g., 804 and 808). For example, when the velocity of the autonomous vehicle is relatively high, more candidate actions can be generated for the subset, such that the autonomous vehicle has more options when conducting the tree search. On the other hand, when the velocity of the autonomous vehicle is relatively low, the candidate action number of the subset can be kept low. As such, the candidate actions number generated can be kept at a relatively low level so as to save computing resources, reduce the latency, etc. Though FIG. 8 shows that each of the subsets 802, 806, 810, 812, and 814 includes 3 candidate actions, and each of the subsets 804 and 808 includes 5 candidate actions, it should be understood that these numbers are exemplary rather than limiting.

In FIGS. 6-8, the individual candidate actions in a subset can be positioned evenly or unevenly. In some examples, the individual candidate actions in a subset can be positioned asymmetrically with respect to the zero point, where the number of individual candidate actions positioned on one side of the zero point is not the same as the number of individual candidate actions positioned on the other side. Alternatively, the individual candidate actions can be positioned symmetrically with respect to the zero point, where the number of individual candidate actions positioned on one side of the zero point is the same as the number of individual candidate actions positioned on the other side. In some instances, the zero point can represent the position of the centerline of the lane in which the autonomous vehicle is traversing. Additionally or alternatively, the zero point can represent the position of the current position of the autonomous vehicle operating in the environment. In some instances, the planning system of the autonomous vehicle can keep the zero point at the position of the centerline of the lane. In some instances, the planning system of the autonomous vehicle can recenter the zero point to be in line with the current position of the autonomous vehicle at each time tick.

Example Process

Figure 9A:
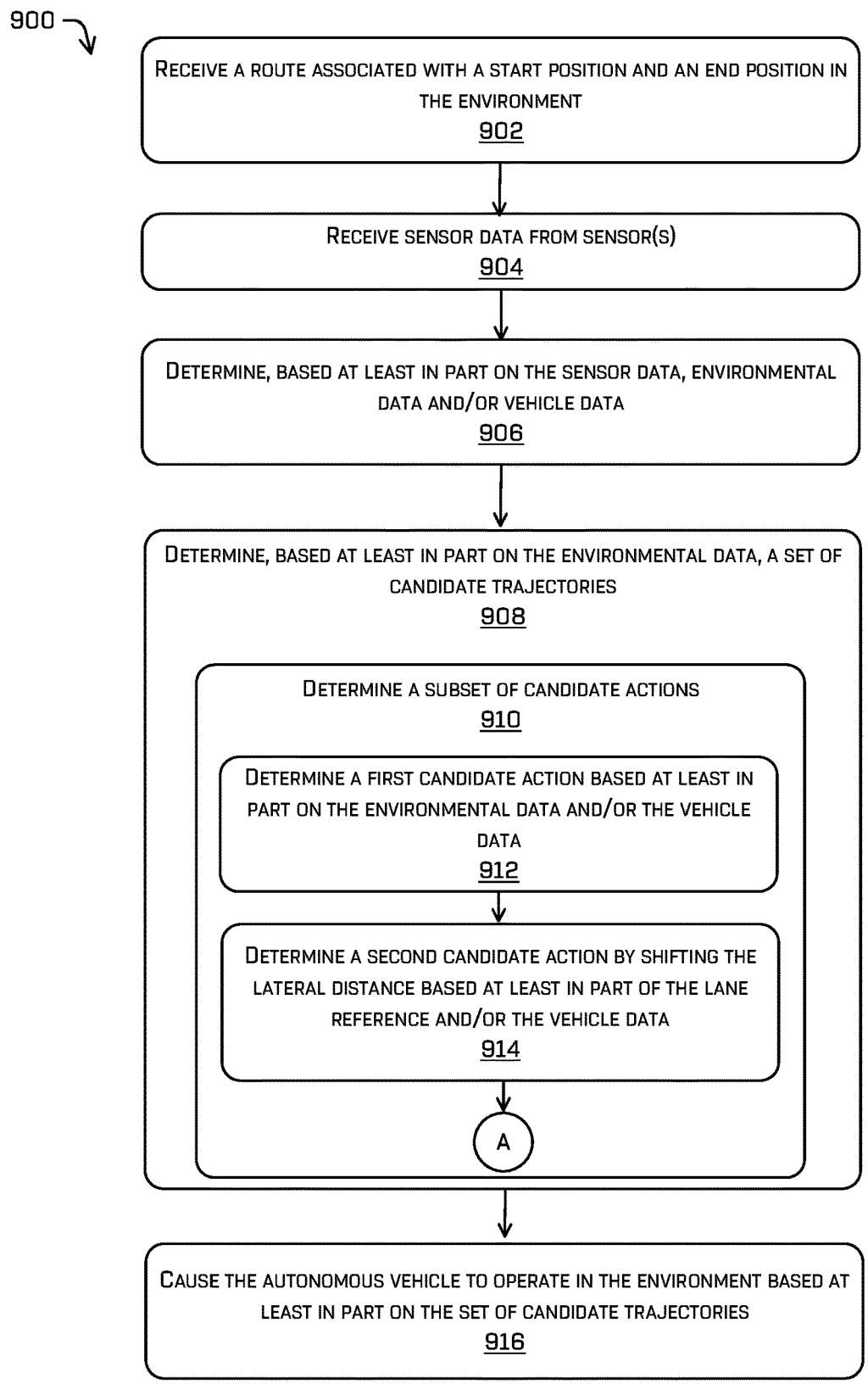
FIGS. 9A and 9B illustrate a flow diagram of an example process for generating a set of candidate trajectories using lateral and/or velocity scaling for an autonomous vehicle that operates in an environment.
Figure 9B:
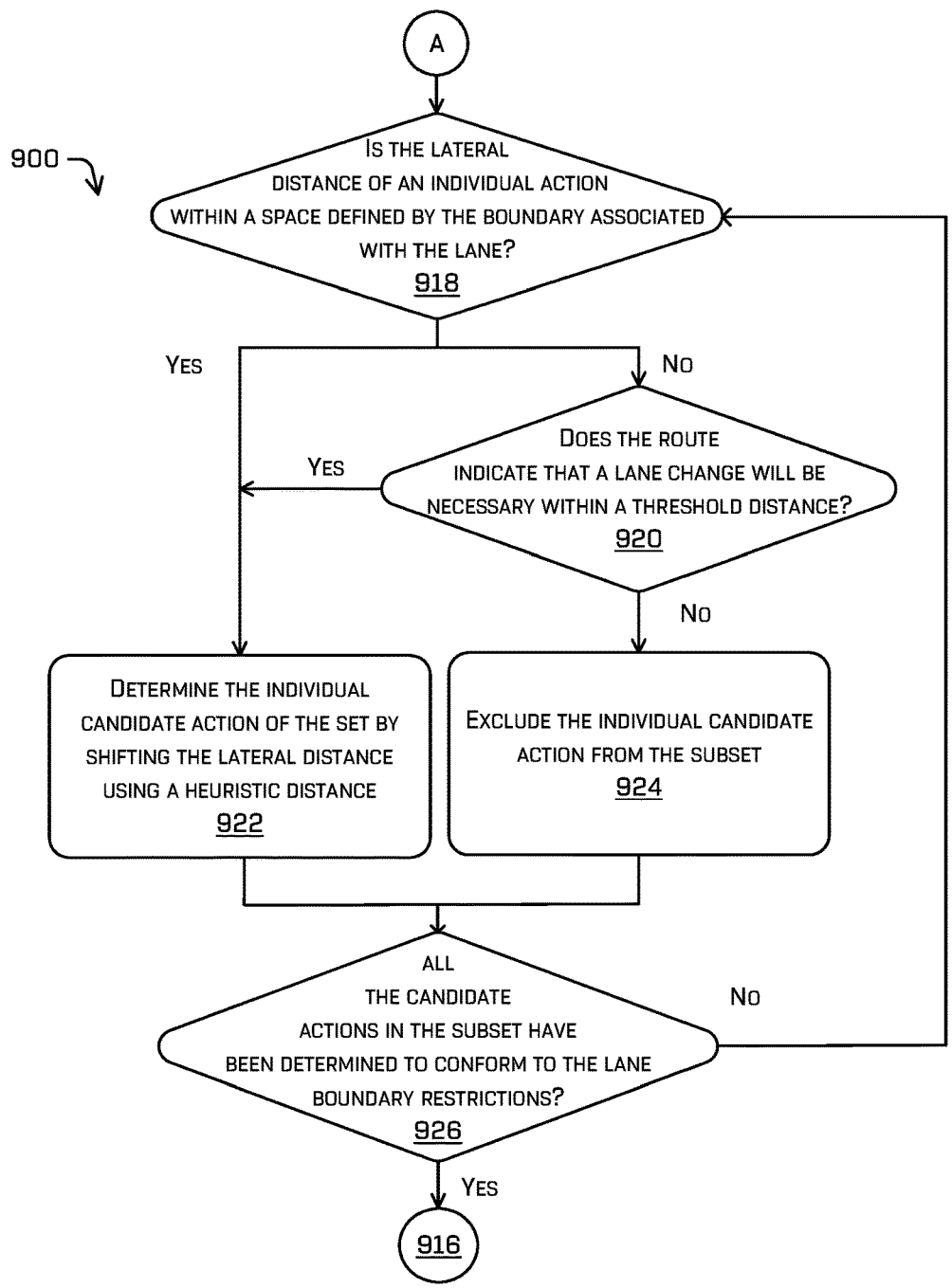

FIGS. 9A and 9B illustrate a flow diagram of an example process 900 for generating a set of candidate trajectories for an autonomous vehicle which operates in an environment. The process 900 is illustrated as flow diagrams, each operation of which represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes. In some instances, some or all of the process 900 can be performed by the planning system 108 of the autonomous vehicle 102 in FIG. 1, the planning system of the autonomous vehicle 202 in FIG. 2, the planning system of the autonomous vehicle 304 in FIG. 3, the planning system of the autonomous vehicle 404 in FIG. 4, and/or the planning system of the autonomous vehicle 504 in FIG. 5 as described herein. However, the process 900 is not limited to being performed by the planning system, and can be performed by other components of the autonomous vehicle.

At 902, operations of the process 900 may include receiving a route associated with a start position and an end position in the environment. For example, an autonomous vehicle equipped with a planning system and/or a perception component may receive the route associated with a start position and an end position in the environment in which the autonomous vehicle traverses.

At 904, operations of the process 900 may include receiving sensor data from sensor(s). In some instances, the planning system and/or the perception component may receive sensor data from sensor(s) of the autonomous vehicle. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc.

At 906, operations of the process 900 may include determining, based at least in part on the sensor data, environmental data, and/or vehicle data associated with the autonomous vehicle. In some examples, the environmental data can include lane references such as a centerline of the lane, lane boundaries of the lane which define a drivable space for the autonomous vehicle to operate, and the lane width associated with the lane. Additionally or alternatively, the environmental data (e.g., lane references, lane width, or the like) can be identified using a map which can be stored in a memory accessible to the autonomous vehicle. Additionally or alternatively, the environmental data can be received by the autonomous vehicle from other computing devices, servers, systems, platforms, vehicles, or the like. In some instances, the vehicle data can include a current position associated with the autonomous vehicle, a vehicle width associated with the autonomous vehicle, a velocity associated with the autonomous vehicle, or the like.

At 908, operations of the process 900 may include determining a set of candidate trajectories based at least in part on the environmental data and/or the vehicle data. An individual trajectory may identify a lateral position for the vehicle to maintain over a distance or time and may additionally or alternatively identify a velocity for the vehicle to maintain over that distance or time. For example, the set of trajectories can be generated using the methods described throughout this disclosure (such as methods described with respect to FIGS. 2-5).

At 910, operations of the process 900 may include determining a subset of candidate actions corresponding to the set of trajectories. In some instances, the set of candidate actions can include one or more subsets of candidate actions disposed at intervals perpendicular to the route. In some instances, an individual subset can include one or more candidate actions that define locations in the environment where the vehicle can operate. In some examples, an individual candidate action can indicate a position, orientation, velocity, acceleration, or the like for the autonomous vehicle to track to by a certain time or distance. In some examples, the planning system of the autonomous vehicle can generate a subset of candidate actions along the route according to a time interval (e.g., every 0.1 seconds, 0.5 seconds, 1 second, or the like). In some examples, the planning system of the autonomous vehicle can generate a subset of candidate actions along the route according to a space interval (e.g., every 1 meter, 5 meters, 10 meters, etc. of the route). In some examples, the planning system can adjust the space/time interval based at least in part on a velocity of the autonomous vehicle. For example, when the autonomous vehicle is operating at a relatively higher velocity, the space/time interval can be shorter. On the other hand, when the autonomous vehicle is operating at a relatively lower velocity, the space/time interval can be longer.

In some examples, an individual candidate action in a subset can correspond to an individual candidate trajectory. In some instances, the autonomous vehicle can switch between individual candidate trajectories depending on which individual candidate actions to take at each time tick when the autonomous vehicle navigates along the route.

At 912, operations of the process 900 may include determining a first candidate action based at least in part on the environmental data and/or the vehicle data. For example, in a centerline-based lateral shifting mode, the planning system of the autonomous vehicle can determine the first candidate action representing the first candidate action to be at the position of the centerline of the lane in which the autonomous vehicle can traverse. As another example, in a vehicle-position-based lateral shifting mode, the planning system of the autonomous vehicle can determine the first candidate action to be at the current position of the autonomous vehicle. As another example, in a vehicle-width-based lateral shifting mode, the planning system of the autonomous vehicle can determine the first candidate action to be at a location shifted from a boundary of the lane with half of the vehicle width toward the centerline of the lane.

At 914, operations of the process 900 may include determining a second candidate action by shifting a lateral distance based at least in part on the environmental data and/or the vehicle data. For example, in a centerline-based lateral shifting mode, the planning system of the autonomous vehicle can determine the second candidate action by shifting a lateral distance from the centerline of the lane toward the boundary of the lane. The lateral distance can be a fraction of the lane width or a heuristic distance. As another example, in a vehicle-position-based lateral shifting mode, the planning system of the autonomous vehicle can determine the second candidate action by shifting a lateral distance from the current position of the vehicle toward the boundary of the lane. As another example, in a vehicle-width-based lateral shifting mode, the planning system of the autonomous vehicle can determine the second candidate action by further shifting a lateral distance from the boundary of the lane toward the centerline of the lane. The lateral distance can be a fraction of the vehicle width or a heuristic distance. In some instances, operations at 914 can be repeated several times to generate multiple subsets of candidate actions along the route.

At 916, operations of the process 900 may include causing the autonomous vehicle to operate in the environment based at least in part on the set of candidate trajectories representing the set of candidate actions. In some instances, the subsets of candidate actions can be used for further purposes in a tree search, such as switching between candidate trajectories at each time tick, choosing paths between two way points (e.g., from a start point to an end point), avoiding objects, avoiding collisions, etc. based on costs or other criteria.

Referring to FIG. 9B, at 918, operations of the process 900 may include determining whether the lateral distance is within a space defined by the boundary associated with the lane in which the autonomous vehicle is operating. In some examples, when the autonomous vehicle is operating within the lane, the planning system can determine whether to discard or keep an individual candidate action based on whether the individual candidate action lies at or beyond the lane boundaries.

At 920, operations of the process 900 may include determining whether the route indicates that a lane change will be necessary within a threshold distance. If yes, the process 900 may proceed to 922. If no, the process 900 may proceed to 924.

At 922, operations of the process 900 may include determining the second candidate action in the set by shifting the lateral distance using a heuristic distance (e.g., a number of meters or the like) based at least in part on determining that the lateral distance is within the space defined by the boundary associated with the lane.

At 924, operations of the process 900 may include excluding the second candidate action from the set based at least in part on determining that the lateral distance is not within the space defined by the boundary associated with the lane. For example, the planning system may determine to discard such an individual candidate action that lies at or beyond a lane boundary when the route does not identify that a lane change will be necessary. Additionally or alternatively, if a lane change will be necessary to follow the route, the planning system may determine to keep such an individual candidate action.

As such, when the autonomous vehicle is operating within the lane, the planning system can keep the candidate action that is within lane space defined by the lane boundaries, and can discard a candidate action representing a candidate action that is shifted laterally outside the lane boundaries, reducing the number of candidate actions in the set, saving resources and storage space, and improving the safety of the operation of the autonomous vehicle.

At 926, operations of the process 900 may include determining whether all the candidate actions in the subset have been determined to conform to the lane boundary restrictions. The restrictions may be based at least in part on determining whether following the route will require a lane change within a threshold distance from a current position of the vehicle. For example, the restrictions may be lifted based at least in part on determining that a lane change will be necessary at some point up to the threshold distance to follow the route. Otherwise, the restrictions may be preserved. Upon determining that not all of the candidate actions in the subset have been determined, the process 900 may go back to 918. Upon determining that not all of the candidate actions in the subset have been determined, the process 900 may move forward to 916. In some instances, the operations in 918-926 can be repeated for different subsets of the set of candidate actions.

Example System

Figure 10:
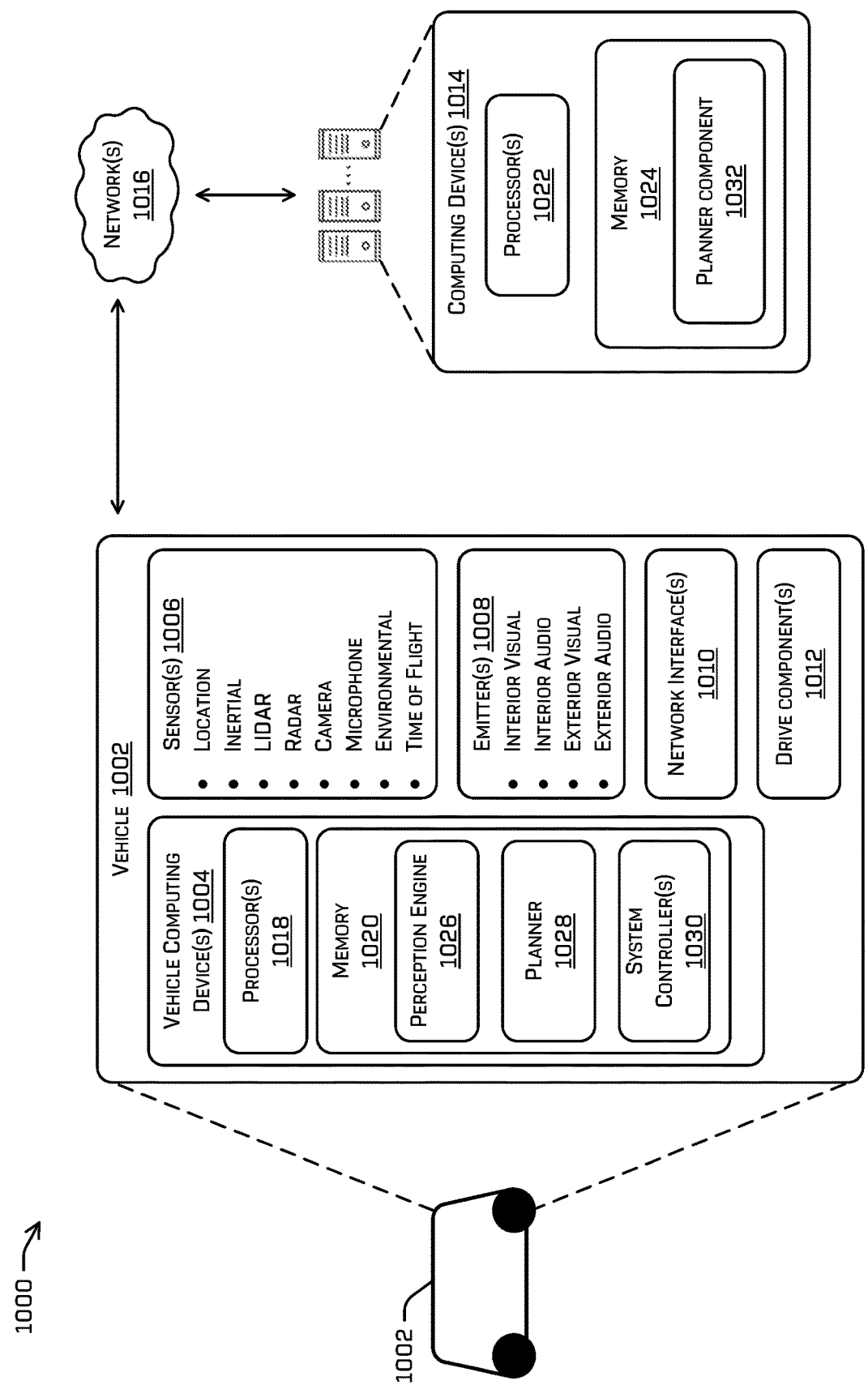
FIG. 10 illustrates a block diagram of an example system that may implement the techniques discussed herein.

FIG. 10 illustrates a block diagram of an example system that implements the techniques discussed herein. In some instances, the system 1000 may include a vehicle 1002, which may correspond to the autonomous vehicle 102 in FIG. 1. In some instances, the vehicle 1002 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1002 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 1002 may include a vehicle computing device 1004, one or more sensor(s) 1006, one or more emitters 1008, one or more network interfaces 1010, and/or one or more drive components 1012. In some instances, vehicle computing device 1004 may represent computing device(s) 106, and/or sensor(s) 1006 may represent sensor(s) 104.

In some instances, the sensor(s) 1006 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., camera, e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 1006 may include multiple instances of each of these or other types of sensors. For instance, the lidar sensors may include individual lidar sensors located at the corners, front, back, sides, and/or top of the vehicle 1002. As another example, the cameras may include multiple cameras disposed at various locations about the exterior and/or interior of the vehicle 1002. The sensor(s) 1006 may provide input to the vehicle computing device 1004.

The vehicle 1002 may also include emitter(s) 1008 for emitting light and/or sound. The emitter(s) 1008 in this example may include interior audio and visual emitter(s) to communicate with passengers of the vehicle 1002. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1008 in this example may also include exterior emitter(s). By way of example and not limitation, the exterior emitter(s) in this example includes lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1002 may also include a network interface(s) 1010 that enables communication between the vehicle 1002 and one or more other local or remote computing device(s). For instance, the network interface(s) 1010 may facilitate communication with other local computing device(s) on the vehicle 1002 and/or the drive component(s) 1012. Also, the network interface(s) 1010 may additionally or alternatively allow the vehicle to communicate with other nearby computing device(s) (e.g., other nearby vehicles, traffic signals, etc.). The network interface(s) 1010 may additionally or alternatively enable the vehicle 1002 to communicate with a computing device(s) 1014. In some examples, computing device(s) 1014 may comprise one or more candidate actions of a distributed computing system (e.g., a cloud computing architecture).

The network interface(s) 1010 may include physical and/or logical interfaces for connecting the vehicle computing device 1004 to another computing device or a network, such as a network(s) 1016. For example, the network interface(s) 1010 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 1004 and/or the sensor(s) 1006 may send sensor data, via the network(s) 1016, to the computing device(s) 1014 at a particular frequency, after a lapse of a predetermined period of time, in near real-time, etc.

In some instances, the vehicle 1002 may include one or more drive components 1012. In some instances, the vehicle 1002 may have a single drive component 1012. In some instances, the drive component(s) 1012 may include one or more sensors to detect conditions of the drive component(s) 1012 and/or the surroundings of the vehicle 1002. By way of example and not limitation, the sensor(s) of the drive component(s) 1012 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1012. In some cases, the sensor(s) on the drive component(s) 1012 may overlap or supplement corresponding systems of the vehicle 1002 (e.g., sensor(s) 1006).

The drive component(s) 1012 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1012 may include a drive component controller which may receive and preprocess data from the sensor(s) and to control the operation of the various vehicle systems. In some instances, the drive component controller may include one or more processors and memory communicatively coupled with the one or more processors. The memory may store one or more components to perform various functionalities of the drive component(s) 1012. Furthermore, the drive component(s) 1012 may also include one or more communication connection(s) that enable communication by the respective drive component with one or more other local or remote computing device(s).

The vehicle computing device 1004 may include one or more processors, processor(s) 1018, and memory 1020 communicatively coupled with the one or more processors 1018. Computing device(s) 1014 may additionally or alternatively include processor(s) 1022, and/or memory 1024. The processor(s) 1018 and/or 1022 may be any suitable processor capable of executing instructions to process data and perform operations as described herein. By way of example and not limitation, the processor(s) 1018 and/or 1022 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 1020 and/or 1024 may be examples of non-transitory computer-readable media. The memory 1020 and/or 1024 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing data. The architectures, systems, and individual elements described herein may include many other logical, programmatic, and physical components, of which those shown in the accompanying figures are merely examples that are related to the discussion herein.

In some instances, the memory 1020 may store a perception component 1026, which may represent perception component 1026, and/or a planning system 1028, which may represent planning system 108, either or both of which may comprise hardware, software, or some combination thereof. The planning system 1028 can be configured to receive sensor data from sensors; determine, based at least in part on the sensor data, environmental data, and/or the vehicle data; and determine, based at least in part on the environmental data and/or the vehicle data, a set of candidate trajectories corresponding to a set of contemporaneous candidate actions for the vehicle to follow. An individual candidate trajectory in the set is determined by dynamically shifting the individual candidate trajectory by a lateral distance relative to the vehicle or a lane in the environment. A candidate action may indicate a position, orientation, velocity, acceleration, or the like for the vehicle to track to by a certain time or distance.

In some examples, the set of candidate actions corresponding to the set of candidate trajectories may be used as part of instantiating a tree search that may determine a path based at least in part on the candidate actions in the set of candidate actions. For example, a candidate action may be indicated by an action node in the tree search, and candidate actions of the same subset of candidate actions may be action nodes at the same level in the tree search. The tree search may determine such a path by choosing a candidate action from a subset of candidate actions at each time tick to execute based on costs determined for a candidate action. Determining a cost associated with a candidate action may include determining a cost, by a cost function, based at least in part on a likelihood that a candidate action avoids an object, a likelihood of impact with an object, conformance to rules of the road, comfort metrics (e.g., an acceleration and/or jerk associated with the candidate action), progress along a route, satisfaction of a mission (e.g., parking, delivering/picking up a passenger), etc. In some instances, the subset of candidate actions corresponds to a node in the tree which is traversed when the planning system determines which candidate action to take and which candidate trajectory to switch to based on the cost function.

In some instances, perception component 1026 may comprise a primary perception system and/or a prediction system implemented in hardware and/or software. The perception component 1026 may detect object(s) in an environment surrounding the vehicle 1002 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 1026 is referred to as perception data. This perception data may be used as part of the environmental data and/or vehicle data discussed herein.

The perception component 1026 may include a prediction component that predicts actions/states of dynamic components of the environment, such as moving objects, although the prediction component may be separate, as in the illustration. The prediction component may predict a future state of an object in the environment surrounding the vehicle 1002. For example, the future state may indicate a predicted object position, orientation, velocity, acceleration, and/or other state (e.g., door state, turning state, intent state such as signaling turn) of that object. In some examples, the perception component 1026 may determine a top-down representation of the environment that encodes the position(s), orientation(s), velocity (ies), acceleration(s), and/or other states of the objects in the environment. For example, the top-down representation may be an image with additional data embedded therein, such as where various pixel values encode the perception data discussed herein. Data determined by the prediction component is referred to as prediction data. Prediction data may be part of the environmental data discussed herein.

In some examples, the perception component 1026 may comprise a localization component. The localization component may include hardware and/or software to receive data from the sensor(s) 1006 to determine a position, velocity, and/or orientation of the vehicle 202 (e.g., one or more of an x-, y-, z-position, roll, pitch, or yaw). For example, the localization component may include and/or request/receive map(s) of an environment (which may be stored in or streamed to memory 1024), and can continuously determine a location, velocity, and/or orientation of the autonomous vehicle within the map(s). In some instances, the localization component may utilize SLAM (simultaneous localization and mapping), CLAMS (calibration, localization, and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 1002, and/or the like In some instances, the localization component may provide data to various components of the vehicle 1002 to determine an initial position of an autonomous vehicle for generating a trajectory and/or for generating map data. In some examples, the localization component may provide, to the perception component 1026, prediction component, and/or planning system 1028 a location and/or orientation of the vehicle 1002 relative to the environment and/or sensor data associated therewith. In some examples, the localization data may be part of the vehicle data discussed herein.

Memory 1020 may additionally or alternatively store one or more system controller(s) 1030 (which may additionally or alternatively be implemented as hardware), which may be configured to control steering, propulsion, braking, safety, emitters, communication, and other systems of the vehicle 1002. These system controller(s) 1030 may communicate with and/or control corresponding systems of the drive component(s) 1012 and/or other components of the vehicle 1002. For example, a planner may generate instructions for controlling vehicle 1002 based at least in part on an output of perception component 1026 and/or planning system 1028, such as a path, and transmit the instructions to the system controller(s) 1030, which may control operation of the vehicle 1002 based at least in part on the instructions.

In some examples, memory 1024 may store a planning system 1032. In some examples, the planner component 1032 may comprise a machine-learned (ML) model (e.g., a neural network) and/or a parallel processing component. The planner component 1032 can perform similar function as the planning system 1028.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional trees), Bayesian algorithms (e.g., naïve Bayes, Gaussian naïve Bayes, multinomial naïve Bayes, average one-dependence estimators (AODE), Bayesian belief network (BBN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

It should be noted that while FIG. 10 is illustrated as a distributed system, in alternative examples, components of the vehicle 1002 may be associated with the computing device(s) 1014, and/or components of the computing device(s) 1014 may be associated with the vehicle 1002. That is, the vehicle 1002 may perform one or more of the functions associated with the computing device(s) 1014, and vice versa.

Example Clauses

A: An autonomous vehicle comprising: one or more processors; a non-transitory memory storing processor-executable instructions that, when executed by the one or more processors, cause the autonomous vehicle to perform operations comprising: receiving sensor data from a sensor associated with the autonomous vehicle; determining, based at least in part on the sensor data, environmental data associated with an environment and/or vehicle data associated with the autonomous vehicle; determining, based at least in part on at least one of the environment data or the vehicle data, a set of candidate trajectories, wherein determining the set of candidate trajectories comprises laterally shifting a first candidate trajectory of the set of candidate trajectories by a lateral distance relative to an orientation of the vehicle or lane based at least in part on at least one of the environmental data or the vehicle data; determining, based at least in part on the set of candidate trajectories, a set of candidate actions comprising subsequent subsets of candidate actions, wherein a subset of candidate actions is associated with a time or distance along the set of candidate trajectories and wherein the subset of candidate actions is indicated by nodes of a same level of a tree search; determining, by a cost function of the tree search, a path through the subsets of candidate actions, wherein determining the path comprises determining a first candidate action from the subset of candidate actions; and controlling the autonomous vehicle based at least in part on the path.

B: The autonomous vehicle of paragraph A, wherein: the environmental data includes a lane reference associated with a lane in the environment, and the lane reference comprises at least one of: a position of a centerline associated with the lane, a position of a boundary associated with the lane, or a lane width associated with the lane; and the lateral distance is a fraction of the lane width associated with the lane.

C: The autonomous vehicle of paragraph B, wherein: the vehicle data comprises at least one of: a current position of the autonomous vehicle, or a vehicle width of the autonomous vehicle; and the lateral distance is based at least in part on the vehicle width and the position of the boundary associated with the lane.

D: The autonomous vehicle of paragraph C, wherein determining the subset of candidate actions further comprises excluding a second candidate action from the subset based at least in part on determining that the second candidate action lies outside a lane associated with the current position of the autonomous vehicle.

E: A method, comprising: receiving sensor data from a sensor associated with a vehicle; determining, based at least in part on the sensor data, at least one of environmental data associated with an environment or vehicle data associated with the vehicle; determining, based at least in part on at least one of the environmental data or the vehicle data, a set of candidate actions, wherein the set of candidate actions corresponds to a set of contemporaneous candidate trajectories for the vehicle to follow, wherein an individual candidate trajectory in the set of contemporaneous candidate trajectories is determined by dynamically shifting the individual candidate trajectory by a lateral distance relative to the vehicle or a lane in the environment; and causing the vehicle to operate in the environment based at least in part on the set of candidate trajectories.

F: The method of paragraph E, wherein the environmental data includes a lane reference associated with the lane in the environment, and the lane reference comprises at least one of: a position of a centerline associated with the lane, a position of a boundary associated with the lane, or a lane width associated with the lane; and wherein the vehicle data comprises at least one of: a current pose associated with the vehicle, a vehicle width associated with the vehicle, or a velocity associated with the vehicle.

G: The method of paragraph F, wherein determining the set of candidate actions comprises determining a subset of candidate actions, and determining the subset of candidate actions comprises: determining a first candidate action of the subset based at least in part on the lane reference and/or the vehicle data; and determining a second candidate action of the subset based at least in part of a lateral distance, the lane reference, and/or the vehicle data.

H: The method of paragraph G, wherein determining the second candidate action comprises determining the second candidate action by shifting the lateral distance based at least in part on the lane reference and/or the vehicle data, the lateral distance being a fraction of the lane width associated with the lane.

I: The method of paragraph G, wherein determining the second candidate action comprises: determining that shifting the lateral distance results in locating the second candidate action within a space defined by the boundary associated with the lane; and determining the second candidate action by shifting the lateral distance corresponding to a heuristic distance based at least in part on determining that the second candidate action is within the space defined by the boundary associated with the lane.

J: The method of paragraph G, wherein determining the second candidate action comprises: determining that shifting the lateral distance results in locating the second candidate action outside a space defined by the boundary associated with the lane; and excluding the second candidate action from the subset based at least in part on determining that the second candidate action is outside the space defined by the boundary associated with the lane.

K: The method of paragraph G, wherein determining the first candidate action of the subset comprises associating the first candidate action with the current position of the vehicle.

L: The method of paragraph G, wherein determining the second candidate action comprises shifting by the lateral distance from the current position of the vehicle based at least in part on at least one of the vehicle width or the position of the boundary associated with the lane.

M: The method of paragraph G, wherein determining the second candidate action comprises shifting the lateral distance from the boundary associated with the lane, the lateral distance being a fraction of the vehicle width.

N: A non-transitory computer-readable medium storing processor-executable instructions that, when executed by one or more processors, cause the one or more processors to perform operations comprising: receiving sensor data from a sensor associated with a vehicle; determining, based at least in part on the sensor data, at least one of environmental data associated with an environment or vehicle data associated with the vehicle; determining, based at least in part on at least one of the environmental data or the vehicle data, a set of candidate actions, wherein the set of candidate actions corresponds to a set of contemporaneous candidate trajectories for the vehicle to follow, wherein an individual candidate trajectory in the set of contemporaneous candidate trajectories is determined by dynamically shifting the individual candidate trajectory by a lateral distance relative to the vehicle or a lane in the environment; and causing the vehicle to operate in the environment based at least in part on the set of candidate trajectories.

O: The non-transitory computer-readable medium of paragraph N, wherein the environmental data includes a lane reference associated with the lane in the environment, and the lane reference comprises at least one of: a position of a centerline associated with the lane, a position of a boundary associated with the lane, or a lane width associated with the lane; and wherein the vehicle data comprises at least one of: a current pose associated with the vehicle, a vehicle width associated with the vehicle, or a velocity associated with the vehicle.

P: The non-transitory computer-readable medium of paragraph O, wherein determining the set of candidate actions comprises determining a subset of candidate actions, and determining the subset of candidate actions comprises: determining a first candidate action of the subset based at least in part on the lane reference and/or the vehicle data; and determining a second candidate action of the subset based at least in part of a lateral distance, the lane reference, and/or the vehicle data.

Q: The non-transitory computer-readable medium of paragraph P, wherein determining the second candidate action comprises determining the second candidate action by shifting the lateral distance based at least in part on the lane reference and/or the vehicle data, the lateral distance being a fraction of the lane width associated with the lane.

R: The non-transitory computer-readable medium of paragraph P, wherein determining the second candidate action comprises: determining that shifting the lateral distance results in locating the second candidate action within a space defined by the boundary associated with the lane; and determining the second candidate action by shifting the lateral distance corresponding to a heuristic distance based at least in part on determining that the second candidate action is within the space defined by the boundary associated with the lane.

S: The non-transitory computer-readable medium of paragraph P, wherein determining the second candidate action comprises: determining that shifting the lateral distance results in locating the second candidate action outside a space defined by the boundary associated with the lane; and excluding the second candidate action from the subset based at least in part on determining that the second candidate action is outside the space defined by the boundary associated with the lane.

T: The non-transitory computer-readable medium of paragraph P, wherein determining the first candidate action of the subset comprises associating the first candidate action with the current position of the vehicle.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements, and/or steps are in any way required for one or more examples or that one or more examples necessarily include logic for deciding, with or without user input or prompting, whether certain features, elements and/or steps are included or are to be performed in any particular example.

Conjunctive languages such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements, or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. An autonomous vehicle comprising:
   one or more processors; and
   a non-transitory memory storing processor-executable instructions that, when executed by the one or more processors, cause the autonomous vehicle to perform operations comprising:
   receiving sensor data from a sensor associated with the autonomous vehicle;
   determining, based at least in part on the sensor data, environmental data associated with an environment or vehicle data associated with the autonomous vehicle;
   determining, based at least in part on at least one of the environmental data or the vehicle data, a set of candidate trajectories, wherein determining the set of candidate trajectories comprises laterally shifting a first candidate trajectory of the set of candidate trajectories by a lateral distance relative to an orientation of the autonomous vehicle or a lane based at least in part on at least one of the environmental data or the vehicle data;

determining, based at least in part on the set of candidate trajectories, a set of candidate actions comprising subsequent subsets of candidate actions, wherein a subset of candidate actions is associated with a time or distance along the set of candidate trajectories and wherein the subset of candidate actions is indicated by nodes of a same level of a tree search;

determining, by a cost function of the tree search, a path through the subsequent subsets of candidate actions, wherein determining the path comprises determining a first candidate action from the subset of candidate actions; and controlling the autonomous vehicle based at least in part on the path.

2. The autonomous vehicle of claim 1, wherein:
the environmental data includes a lane reference associated with the lane in the environment, and the lane reference comprises at least one of:
a position of a centerline associated with the lane,
a position of a boundary associated with the lane, or
a lane width associated with the lane; and
the lateral distance is a fraction of the lane width associated with the lane.

3. The autonomous vehicle of claim 2, wherein:
the vehicle data comprises at least one of:
a current position of the autonomous vehicle, or
a vehicle width of the autonomous vehicle; and
the lateral distance is based at least in part on the vehicle width and the position of the boundary associated with the lane.

4. The autonomous vehicle of claim 3, wherein determining the subset of candidate actions further comprises excluding a second candidate action from the subset of candidate actions based at least in part on determining that the second candidate action lies outside a lane associated with the current position of the autonomous vehicle.

5. A method, comprising:
receiving sensor data from a sensor associated with a vehicle;
determining, based at least in part on the sensor data, at least one of environmental data associated with an environment or vehicle data associated with the vehicle;
determining, based at least in part on at least one of the environmental data or the vehicle data, a set of candidate actions, wherein the set of candidate actions corresponds to a set of contemporaneous candidate trajectories for the vehicle to follow, wherein an individual candidate trajectory in the set of contemporaneous candidate trajectories is determined by dynamically shifting the individual candidate trajectory by a lateral distance relative to the vehicle or a lane in the environment; and
causing the vehicle to operate in the environment based at least in part on the set of contemporaneous candidate trajectories.

6. The method of claim 5, wherein the environmental data includes a lane reference associated with the lane in the environment, and the lane reference comprises at least one of:
a position of a centerline associated with the lane,
a position of a boundary associated with the lane, or
a lane width associated with the lane; and wherein the vehicle data comprises at least one of:
a current pose associated with the vehicle,
a vehicle width associated with the vehicle, or
a velocity associated with the vehicle.

7. The method of claim 6, wherein determining the set of candidate actions comprises determining a subset of candidate actions, and determining the subset of candidate actions comprises:
determining a first candidate action of the subset of candidate actions based at least in part on the lane reference and/or the vehicle data; and
determining a second candidate action of the subset of candidate actions based at least in part on the lateral distance, the lane reference, and/or the vehicle data.

8. The method of claim 7, wherein determining the second candidate action comprises determining the second candidate action by shifting the lateral distance based at least in part on the lane reference and/or the vehicle data, the lateral distance being a fraction of the lane width associated with the lane.

9. The method of claim 7, wherein determining the second candidate action comprises:
determining that shifting the lateral distance results in locating the second candidate action within a space defined by the boundary associated with the lane; and
determining the second candidate action by shifting the lateral distance corresponding to a heuristic distance based at least in part on determining that the second candidate action is within the space defined by the boundary associated with the lane.

10. The method of claim 7, wherein determining the second candidate action comprises:
determining that shifting the lateral distance results in locating the second candidate action outside a space defined by the boundary associated with the lane; and
excluding the second candidate action from the subset of candidate actions based at least in part on determining that the second candidate action is outside the space defined by the boundary associated with the lane.

11. The method of claim 7, wherein determining the first candidate action of the subset of candidate actions comprises associating the first candidate action with a current position of the vehicle.

12. The method of claim 7, wherein determining the second candidate action comprises shifting by the lateral distance from a current position of the vehicle based at least in part on at least one of the vehicle width or the position of the boundary associated with the lane.

13. The method of claim 7, wherein determining the second candidate action comprises shifting the lateral distance from the boundary associated with the lane, the lateral distance being a fraction of the vehicle width.

14. A non-transitory computer-readable medium storing processor-executable instructions that, when executed by one or more processors, cause the one or more processors to perform operations comprising:
receiving sensor data from a sensor associated with a vehicle;
determining, based at least in part on the sensor data, at least one of environmental data associated with an environment or vehicle data associated with the vehicle;
determining, based at least in part on at least one of the environmental data or the vehicle data, a set of candidate actions, wherein the set of candidate actions corresponds to a set of contemporaneous candidate trajectories for the vehicle to follow, wherein an individual candidate trajectory in the set of contemporaneous candidate trajectories is determined by dynamically shifting the individual candidate trajectory by a lateral distance relative to the vehicle or a lane in the environment; and causing the vehicle to operate in the environment based at least in part on the set of contemporaneous candidate trajectories.

15. The non-transitory computer-readable medium of claim 14, wherein the environmental data includes a lane reference associated with the lane in the environment, and the lane reference comprises at least one of:

a position of a centerline associated with the lane,
a position of a boundary associated with the lane, or
a lane width associated with the lane; and
wherein the vehicle data comprises at least one of:
a current pose associated with the vehicle,
a vehicle width associated with the vehicle, or
a velocity associated with the vehicle.

16. The non-transitory computer-readable medium of claim 15, wherein determining the set of candidate actions comprises determining a subset of candidate actions, and determining the subset of candidate actions comprises:

determining a first candidate action of the subset based at least in part on the lane reference and/or the vehicle data; and determining a second candidate action of the subset of candidate actions based at least in part on the lateral distance, the lane reference, and/or the vehicle data.

17. The non-transitory computer-readable medium of claim 16, wherein determining the second candidate action comprises determining the second candidate action by shifting the lateral distance based at least in part on the lane reference and/or the vehicle data, the lateral distance being a fraction of the lane width associated with the lane.

18. The non-transitory computer-readable medium of claim 16, wherein determining the second candidate action comprises:

determining that shifting the lateral distance results in locating the second candidate action within a space defined by the boundary associated with the lane; and determining the second candidate action by shifting the lateral distance corresponding to a heuristic distance based at least in part on determining that the second candidate action is within the space defined by the boundary associated with the lane.

19. The non-transitory computer-readable medium of claim 16, wherein determining the second candidate action comprises:

determining that shifting the lateral distance results in locating the second candidate action outside a space defined by the boundary associated with the lane; and excluding the second candidate action from the subset of candidate actions based at least in part on determining that the second candidate action is outside the space defined by the boundary associated with the lane.

20. The non-transitory computer-readable medium of claim 16, wherein determining the first candidate action of the subset of candidate actions comprises associating the first candidate action with current position of the vehicle.

* * * * *